(12) United States Patent
Miwa et al.

(10) Patent No.: US 9,296,079 B2
(45) Date of Patent: Mar. 29, 2016

(54) DUST COLLECTING DEVICE

(75) Inventors: Masao Miwa, Anjo (JP); Masanori Furusawa, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 825 days.

(21) Appl. No.: 13/209,713

(22) Filed: Aug. 15, 2011

(65) Prior Publication Data

US 2012/0210535 A1     Aug. 23, 2012

(30) Foreign Application Priority Data

Aug. 23, 2010  (JP) ................................. 2010-186597
Oct. 20, 2010  (JP) ................................. 2010-235609

(51) Int. Cl.
*B23B 47/34*     (2006.01)
*B23Q 11/00*     (2006.01)
(Continued)

(52) U.S. Cl.
CPC ............. *B23Q 11/0046* (2013.01); *F16J 3/045* (2013.01); *B23B 2251/68* (2013.01);
(Continued)

(58) Field of Classification Search
CPC ............ B23B 2251/68; B23B 2270/62; B23B 2270/30; B23Q 11/0042; B23Q 11/0071; B23Q 11/0053; B23Q 11/0816; B23Q 11/0046; B25D 17/20; B08B 15/04; Y10T 409/554
USPC ......... 408/67, 76, 110, 113; 409/137; 83/100; 82/901
See application file for complete search history.

(56) References Cited

U.S. PATENT DOCUMENTS 3,757,891 A * 9/1973 Krieger ...................... 181/205
4,878,389 A * 11/1989 Boge ............................ 277/636
(Continued)

FOREIGN PATENT DOCUMENTS

AU    2007100367 A4    6/2007
CA    2 360 872         4/2003
(Continued)

OTHER PUBLICATIONS

Dec. 30, 2011 Search Report issued in European Patent Application No. 11177963.3.
(Continued)

*Primary Examiner* — Eric A Gates
*Assistant Examiner* — Paul M Janeski
(74) *Attorney, Agent, or Firm* — Oliff PLC

(57) ABSTRACT

It is an object of the invention to provide a technique for adapting to the length of a tool bit mounted to a power tool when tool bits of different lengths are selectively used by replacement to perform an operation, in a dust collecting device for collecting dust generated by operation of the power tool. A dust collecting device 210 is attached to a power tool 101 and collects dust generated by operation. The dust collecting device 210 includes a dust collecting part that covers a tool bit 119 over a predetermined range in the axial direction and collects dust generated by operation. The dust collecting part is formed in one of a first form and a second form which is arbitrarily selected. In the first form, the dust collecting part is formed by a dust collecting part component 221 which has a tool bit covering part 223 having a predetermined inside diameter and a fitting part 227 connected to the tool bit covering part 223, while, in the second form, the dust collecting part is formed by connecting a plurality of the dust collecting part components 221 via the fitting part 227 in the axial direction.

11 Claims, 23 Drawing Sheets

(51) Int. Cl.
 *F16J 3/04* (2006.01)
 *B23Q 11/08* (2006.01)
(52) U.S. Cl.
 CPC ........ *B23B 2270/30* (2013.01); *B23B 2270/62* (2013.01); *B23Q 11/0071* (2013.01); *B23Q 11/0816* (2013.01); *Y02P 70/171* (2015.11); *Y10T 408/554* (2015.01); *Y10T 409/304088* (2015.01)

(56) References Cited

U.S. PATENT DOCUMENTS

| | | | |
|---|---|---|---|
| 7,210,881 B2 * | 5/2007 | Greenberg | 408/202 |
| 8,534,633 B2 * | 9/2013 | Tell | 248/363 |
| 2007/0243031 A1 * | 10/2007 | Yun | 408/67 |
| 2007/0261195 A1 | 11/2007 | Bleicher et al. | |
| 2010/0155095 A1 | 6/2010 | Furusawa et al. | |
| 2011/0008118 A1 * | 1/2011 | Yoshikane et al. | 408/67 |

FOREIGN PATENT DOCUMENTS

| | | |
|---|---|---|
| EP | 1 842 612 A1 | 10/2007 |
| JP | U-2-121666 | 10/1990 |
| JP | 08071886 A * | 3/1996 |
| JP | A-2000-334636 | 12/2000 |
| JP | A-2007-303271 | 11/2007 |
| JP | A-2010-162683 | 7/2010 |

OTHER PUBLICATIONS

Jan. 26, 2014 Office Action issued in Chinese Patent Application No. 201110240975.8.

Jan. 15, 2014 Office Action issued in Japanese Patent Application No. 2010-186597.

Sep. 15, 2014 Office Action issued in Chinese Application No. 201110240975.8.

Jul. 14, 2015 Office Action issued in Russian Application No. 2011135105.

* cited by examiner

DUST COLLECTING DEVICE

BACKGROUND OF THE INVENTION

1. Field of the Invention

The invention relates to a dust collecting device for collecting dust generated when a power tool performs a predetermined operation.

2. Description of the Related Art

Japanese laid-open patent publication No. 2007-303271 discloses a dust collecting device which has a cylindrical hood arranged to surround a bit and sucks up dust generated by operation through a front end opening of the hood and collects it (through a pipe and a dust transfer passage formed within the power tool body).

In the known dust collecting device, the front end of the hood is fixed at a fixed position with respect to the tool body of the hammer drill.

Therefore, for example, when a longer bit than an ordinary bit is used for an operation, the hood front end is situated away from a point of dust generation, so that the dust collecting efficiency is lowered.

SUMMARY OF THE INVENTION

Accordingly, it is an object of the invention to provide a technique for adapting to the length of a tool bit mounted to a power tool when tool bits of different lengths are selectively used by replacement to perform an operation, in a dust collecting device for collecting dust generated by operation of the power tool.

In order to solve the above-described problem, according to a preferred embodiment of the invention, a dust collecting device is provided which is attached to a power tool that performs a predetermined operation on a workpiece by driving a tool bit coupled to a front end region of a tool body, and collects dust generated by operation. The "power tool" to which the dust collecting device is applied typically includes an electric hammer or a hammer drill for use in chipping operation, and a hammer drill or an electric drill for use in drilling operation.

The dust collecting device of this invention includes a dust collecting part that covers the tool bit over a predetermined range in the axial direction and collects dust generated by operation. The dust collecting part is formed in one of a first form and a second form which is arbitrarily selected, and in the first form, the dust collecting part is formed by a dust collecting part component which has a tool bit covering part having a predetermined inside diameter and a fitting part connected to the tool bit covering part, while, in the second form, the dust collecting part is formed by connecting a plurality of the dust collecting part components via the fitting part in the axial direction. As for the manner in which the dust collecting part "covers the tool bit over a predetermined range in the axial direction", when the power tool is an electric hammer or a hammer drill for use in chipping operation, it refers to the manner in which the dust collecting part covers the tool bit such that the tip of the tool bit is exposed (protrudes) from the front end of the dust collecting part by a length required for chipping operation. When the power tool is a hammer drill or an electric drill for use in drilling operation, it refers to the manner in which the dust collecting part covers the length of the tool bit including its tip.

According to the dust collecting device of this invention, the dust collecting part can be formed in a length appropriate to the length of the tool bit by selecting one of the first and second forms which is appropriate to the length of the tool bit to be used for the operation, or either the form formed by one dusting collecting part component or the form formed by connecting a plurality of (two or three) dusting collecting part components. Thus, the length of the dust collecting part can be appropriately determined according to the length of the tool bit to be used, and the dust generated by operation can be efficiently collected.

According to a further embodiment of the invention, in the second form, the plurality of the dust collecting part components are identically shaped. With such a construction, when the dust collecting part components are formed, for example, by using a "mold", they can be formed by using the same molds, so that the manufacturing costs can be reduced.

According to a further embodiment of the invention, the dust collecting device is used with a power tool for performing a drilling operation on a workpiece at least by rotation of the tool bit. Further, the dust collecting part component is constructed to be able to change its length in the axial direction during drilling operation. The manner of "changing its length in the axial direction" refers to the manner of change of the dust collecting part component in the axial direction which is caused when an external force is applied to the dust collecting part component in the axial direction, and it widely includes the manner of contracting and extending by accordion-folding in the axial direction, and the manner of contracting and extending by relative sliding movement of the plurality of the components in the axial direction. For example, in the second form, it is essential to be constructed such that at least one of the dust collecting part components changes its length. The dust collecting device of the invention is suitably applied to a hammer drill or an electric drill which performs a drilling operation by rotation of the tool bit with the front end of the dust collecting part component being pressed against the workpiece. The dust collecting part component contracts when pushed by the surface of the workpiece as the drilling operation proceeds, so that the dust collecting function can be maintained.

According to a further embodiment of the invention, in the dust collecting device in which the dust collecting part component is constructed to be able to change its length in the axial direction, the tool bit covering part comprises a cylindrical accordion part which can contract and extend, and the fitting part comprises a ring-like reinforcing member which is formed separately from the accordion part. The "reinforcing member" in this invention is typically formed by a member having a higher hardness than the tool bit covering part. Therefore, in the second form, when the plurality of the dust collecting part components are connected and used in an elongate form extending in the axial direction, in a drilling operation which is performed on a vertical wall with the dust collecting part components placed in a horizontal position, the fitting part which connects the dust collecting part components effectively functions as a reinforcing member which prevents the dust collecting part components from deforming (hanging down) under their own weight. Further, the fitting part on the front end of the dust collecting part component avoids the tool bit covering part from interfering with the tool bit and the workpiece and thus protects the tool bit covering part.

According to a further embodiment of the invention, in the dust collecting device in which the fitting part comprises a ring-like reinforcing member, the fitting part of the dust collecting part component has a smaller inside diameter than the accordion part, and a space is formed between an inside wall and an outside wall of the fitting part and forms a dust collecting passage extending through the fitting part in the axial direction. According to this invention, by provision of the space as a dust collecting passage between the inside wall and the outside wall of the fitting part, the inner circumferential surface of the fitting part can be placed in contact with or closer to the outer circumferential surface of the shank of the tool bit. Therefore, the dust collecting effect is maintained and the inner circumferential surface of the fitting part can be utilized as a guide for the dust collecting part component with respect to the tool bit, so that the stability of the dust collecting part component can be achieved.

According to a further embodiment of the invention, the dust collecting device is used with a power tool for performing an operation on a workpiece by linear movement of the tool bit in the axial direction. Further, the dust collecting part component is constructed such that its length in the axial direction is kept unchanged during operation. The dust collecting device of this invention is constructed such that the axial length of the dust collecting part component is kept constant or unchanged during operation, and can be suitably applied to an electric hammer or a hammer drill which performs a chipping operation by linear movement of the tool bit with the tip of the tool bit being exposed a predetermined length from the front end of the dust collecting part.

According to a further embodiment of the invention, the dust collecting device further includes a dust collecting device body which is mounted to cover the front end region of the tool body. Further, the dust collecting part component has a first fitting part formed on one axial end and having a grooved outer surface for fitting and a second fitting part formed on the other axial end and having a grooved inner surface for fitting, and the first fitting part is fitted on the front end of the dust collecting device body and forms a grip to be held by a user. According to this invention, the fitting part of the dust collecting device can be utilized as a subgrip to be held by the user. At this time, the grooved outer surface of the fitting part functions as a nonslip grip.

According to a further embodiment of the invention, a power tool having the dust collecting device as defined above is provided. Thus, the power tool can be provided with the dust collecting device in which the length of the dust collecting part can be appropriately determined according to the length of the tool bit to be used and which can efficiently collect dust generated by operation.

According to the invention, a technique is provided for adapting to the length of a tool bit mounted to a power tool when tool bits of different lengths are selectively used by replacement to perform an operation, in a dust collecting device for collecting dust generated by operation of the power tool.

Further, according to another aspect of the invention to achieve the above-described object of the invention, representative dust collecting device may have a fixing part which is mounted to a tool body of a power tool to which a tool bit is coupled and a dust collecting hood which is mounted to the fixing part and covers the tool bit over a predetermined range in an axial direction of the tool bit. The "power tool" to which the dust collecting device is applied typically includes an electric hammer or hammer drill for use in chipping operation and a hammer drill or electric drill for use in drilling operation. The manner in which the dust collecting hood "covers the tool bit over a predetermined range in an axial direction" in this invention refers to the manner in which the dust collecting hood covers the tool bit such that a tip of the tool bit is exposed from the front end of the dust collecting hood by a length required for chipping operation when, for example, the power tool is an electric hammer or hammer drill for use in chipping operation, and it refers to the manner in which the dust collecting hood covers the length of the tool bit including its tip when the power tool is a hammer drill or electric drill for use in drilling operation.

The preferred embodiment of the invention is characterized in that the dust collecting device has a plurality of mounting points which are formed on the dust collecting hood at predetermined intervals in the axial direction of the tool bit and at which the dust collecting hood can be mounted to the fixing part. Further, the protruding length of the dust collecting hood protruding from the tool body in the axial direction of the tool bit can be changed by selecting arbitrary one of the mounting points.

According to this invention, the dust collecting hood is mounted to the fixing part at arbitrarily selected one of the mounting points provided on the dust collecting hood in the axial direction of the tool bit, so that the protruding length of the dust collecting hood from the tool body in the axial direction of the tool bit can be adapted to the length of the tool bit to be used. As a result, dust generated by operation can be efficiently collected.

In a further embodiment of this invention, the dust collecting hood has an elastic region which can elastically deform in the axial direction of the tool bit. Further, the selection of the mounting point is made by utilizing elastic deformation of the elastic region.

According to this invention, with the construction in which the mounting point can be selected by utilizing elastic deformation, the mounting point can be easily changed. Further, the elastically deformable elastic region is preferably formed, for example, by an expandable part of an accordion folded structure.

According to a further embodiment of the invention, the dust collecting hood is designed such that the selection of the mounting point can be made with a length of the dust collecting hood kept constant in the axial direction of the tool bit. Such a construction can be typically realized by provision of the construction in which the dust collecting hood is mounted to the fixing part such that it can slide in the axial direction with respect to the fixing part and the mounting point can be selected by this sliding movement. Further, the state in which "the length of the dust collecting hood is kept constant in the axial direction" represents the state in which the length of the dust collecting hood in the axial direction is kept unchanged, and specifically, the dust collecting hood is formed by a rigid element.

According to a further embodiment of the invention, a lock mechanism is provided on the fixing part and serves to maintain a mounted state of the dust collecting hood with respect to the fixing part by engaging with the selected mounting point.

According to the invention, with the construction in which the mounted state of the dust collecting hood with respect to the fixing part can be maintained by the lock mechanism, the protruding length of the dust collecting hood protruding from the tool body can be prevented from unexpectedly changing during operation, or the dust collecting hood can be prevented from becoming detached from the fixing part.

According to a further embodiment of the invention, a power tool having the dust collecting device as defined in any one of claims 1 to 5 is provided. Thus, the power tool can be provided with the dust collecting device in which the length of the dust collecting hood can be appropriately determined according to the length of the tool bit to be used and which can efficiently collect dust generated by operation. Other objects, features and advantages of the invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved dust collecting devices and method for using such dust collecting devices and component devices utilized therein, as well as power tools utilizing such devices. Representative examples of the invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
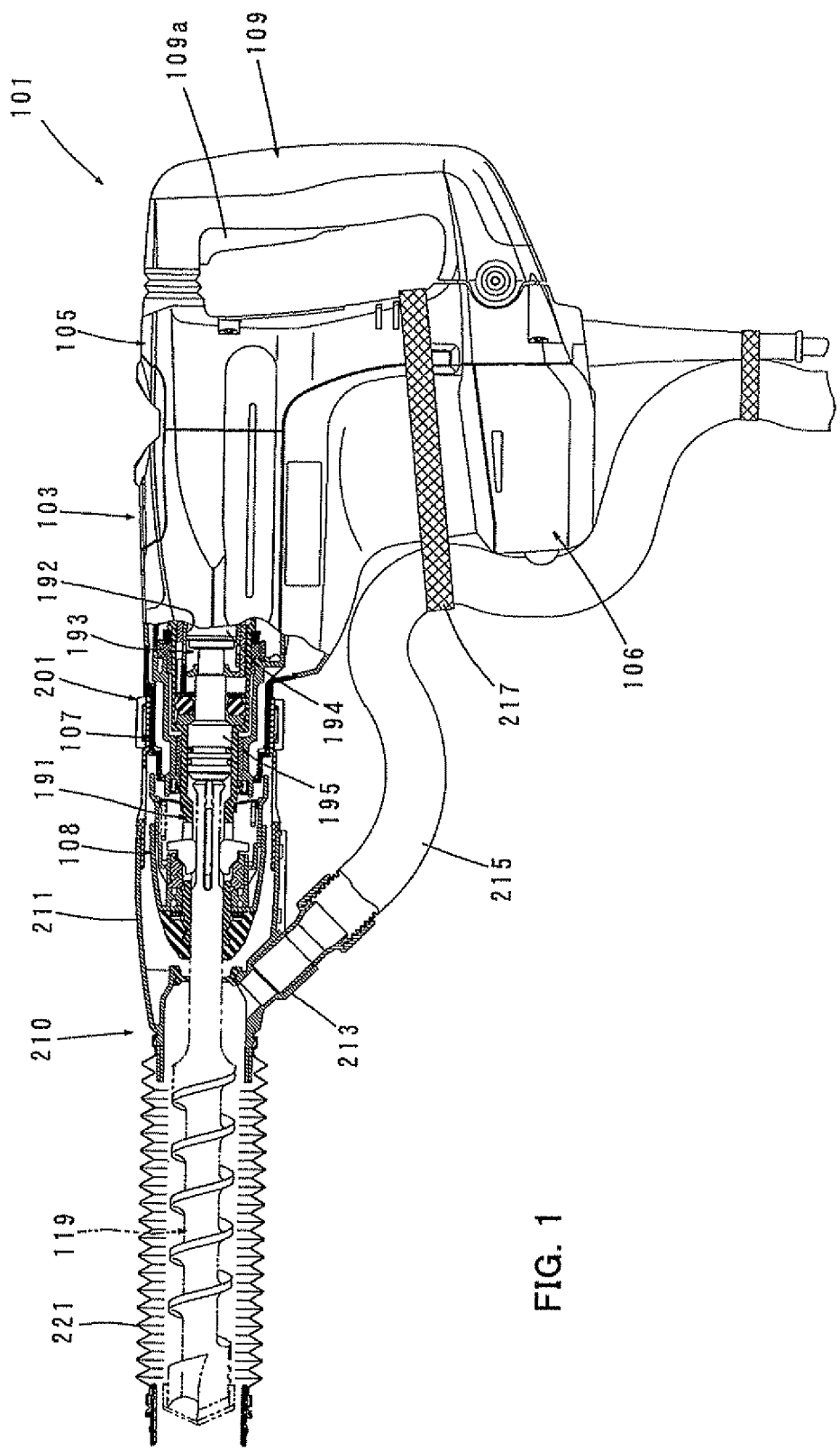
FIG. 1 is a side view, partly in section, showing an entire structure of a hammer drill to which a dust collecting device for use in drilling operation according to an embodiment of the invention is attached.

A dust collecting device according to an embodiment of the invention is now described with reference to FIGS. 1 to 13. This embodiment is explained as being applied to an electric hammer drill which is a representative example of a power tool. FIG. 1 shows a hammer drill 101 with an auxiliary handle in the form of a side grip 201 (only partly shown in the drawing) and a dust collecting device 210 attached thereto. The construction of the hammer drill 101 is now briefly explained with reference to FIG. 1. The hammer drill 101 mainly includes a body 103 that forms an outer shell of the hammer drill 101, an elongate hammer bit 119 detachably coupled to a tip end region (on the left as viewed in FIG. 1) of the body 103 via a tool holder 191, and a main handle in the form of a handgrip 109 that is connected to the body 103 on the side opposite the hammer bit 119 and designed to be held by a user. The body 103 and the hammer bit 119 are features that correspond to the "tool body" and the "tool bit", respectively, according to the invention. The hammer bit 119 is inserted into a bit insertion hole of the tool holder 191 and held by a chuck 108 such that it is allowed to reciprocate with respect to the tool holder in its axial direction and prevented from rotating with respect to the tool holder in its circumferential direction. For the sake of convenience of explanation, the side of the hammer bit 119 is taken as the front and the side of the handgrip 109 as the rear.

The body 103 mainly includes a motor housing 106 that houses a driving motor (not shown), a crank housing 105 that houses a motion converting mechanism (not shown), a striking mechanism 193 and a power transmitting mechanism (not shown), and a generally cylindrical barrel 107 connected to a front of the crank housing 105. Rotating power of the driving motor is appropriately converted into linear motion by the motion converting mechanism 113 which mainly includes a crank mechanism, and then transmitted to the striking mechanism 193. As a result, an impact force is generated in the axial direction of the hammer bit 119 via the striking mechanism 193. Further, the speed of the rotating power of the driving motor is appropriately reduced by the power transmitting mechanism which mainly includes a plurality of gears, and then transmitted to the hammer bit 119 via a final shaft in the form of the tool holder 191, so that the hammer bit 119 is caused to rotate in its circumferential direction. The driving motor 111 is driven when a user depresses a trigger 109a disposed on the handgrip 109.

The striking mechanism 193 mainly includes a striking element in the form of a striker 194 which is slidably disposed within a bore of a cylinder 192 together with a piston of the crank mechanism, and an intermediate element in the form of an impact bolt 195 which is slidably disposed in the tool holder 191. The striker 194 is driven via an air spring action (pressure fluctuations) of an air chamber of the cylinder 192 which is caused by sliding movement of the piston. Then the striker 194 collides with (strikes) the impact bolt 195 and a striking force is transmitted to the hammer bit 119 via the impact bolt 195.

Further, the hammer drill 101 can be appropriately switched between hammering mode for chipping operation which is performed on a workpiece by applying only a striking force to the hammer bit 119 in the axial direction, and hammer drill mode for drilling operation which is performed on a workpiece by applying a striking force in the axial direction and a rotating force in the circumferential direction. This technique is well known in the art and not directly related to the invention, and therefore its further description is omitted.

A dust collecting device 210 is now explained with reference to FIGS. 2 to 13. The dust collecting device 210 is attached to the hammer drill 101 having the above-described construction and serves to suck and collect dust generated during operation on a workpiece (such as concrete). The dust collecting device 210 according to this embodiment mainly includes a dust cover in the form of a synthetic resin cylindrical mounting part 211 which is attached to the barrel 107 of the hammer drill 101 together with a side grip 201, an extendable dust collecting hood 221 (see FIG. 2) for use in drilling operation and a dust collecting hood 241 (see FIG. 10) for use in chipping operation. The dust collecting hood 221 can be removably attached to a front end of the cylindrical mounting part 211 and is constructed to be able to change its length in the longitudinal direction, and the dust collecting hood 241 can be removably attached to the front end of the cylindrical mounting part 211 and is constructed such that its length in the longitudinal direction is kept unchanged. The dust collecting hoods 221, 241 can be selectively attached to the front end of the cylindrical mounting part 211 by replacement according to the operation. Specifically, for drilling operation, the dust collecting device 210 is formed by combination of the cylindrical mounting part 211 and the dust collecting hood 221 for use in drilling operation, while, for chipping operation, the dust collecting device 210 is formed by combination of the cylindrical mounting part 211 and the dust collecting hood 241 for use in chipping operation. The cylindrical mounting part 211 is a feature that corresponds to the "dust collecting device body" according to this invention. The dust collecting hood 221 for use in drilling operation and the dust collecting hood 241 for use in chipping operation are features that each correspond to the "dust collecting part component" according to this invention.

Figure 2:
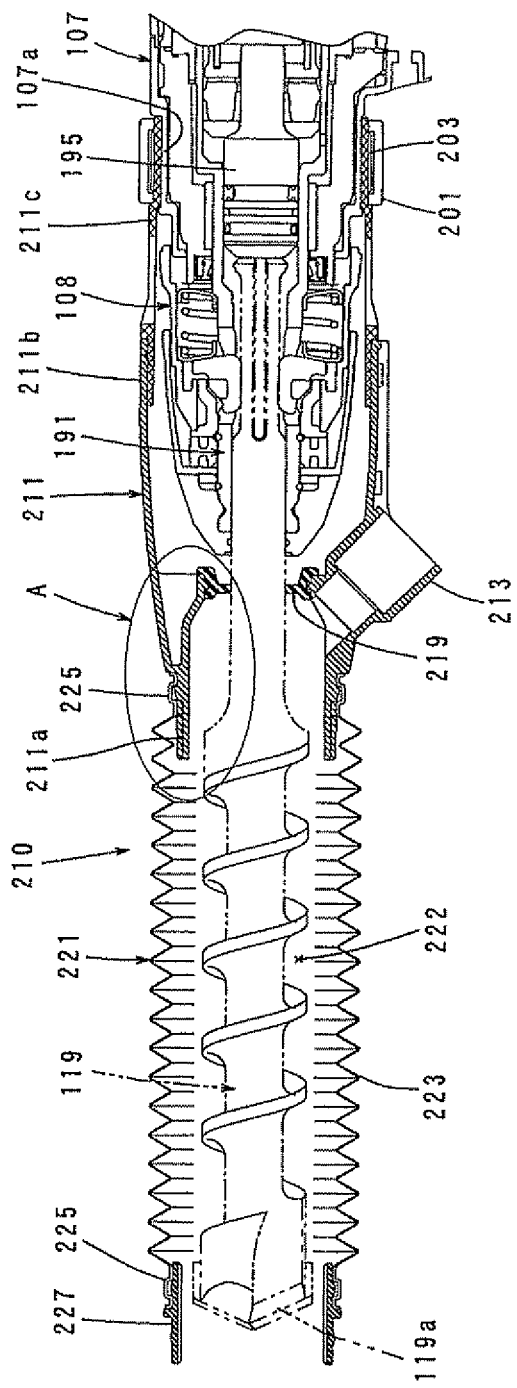
FIG. 2 is a sectional view showing an entire structure of the dust collecting device for drilling operation, having a dust collecting part formed by one dust collecting part component.

As shown in FIG. 2, the cylindrical mounting part 211 is a generally cylindrical member extending in the axial direction of the hammer bit and has both ends open in the axial direction. The cylindrical mounting part 211 has a front portion formed by a small-diameter cylindrical part 211a on which the dust collecting hood 221 for use in drilling operation and the dust collecting hood 241 for use in chipping operation can be mounted, and a rear portion formed by a large-diameter cylindrical part 211b. Further, a cylindrical part extension 211c is formed contiguously to a rear region (on the right as viewed in FIG. 2) of the large-diameter cylindrical part 211b. The cylindrical part extension 211c extends in the axial direction and is split into several portions in the circumferential direction by a plurality of slits (not shown) each having an open rear end, so that it is allowed to elastically deform in the radial direction.

In order to mount the cylindrical mounting part 211 to the barrel 107, the cylindrical mounting part 211 is set to cover the front end portion of the barrel 107 from the front (the left as viewed in FIG. 2) and the cylindrical part extension 211c is fixed by a mounting band 203 for the side grip 201 which is mounted to the barrel 107. The mounting band 203 for the side grip 201 is set to be wrapped around the outer surface of a grip mounting part 107a formed on the barrel 107 and tightened or loosened by using a screw structure (not shown). Specifically, the dust collecting device 210 is fixed together with the side grip 201 on the grip mounting part 107a of the barrel 107 in the body 103 by tightening the cylindrical part extension 211c of the cylindrical mounting part 211 with the mounting band 203.

Further, a hose connecting port 213 is formed on the small-diameter cylindrical part 211a of the cylindrical mounting part 211 and communicates with an inner space of the dust collecting hood 221 for drilling operation or the dust collecting hood 241 for chipping operation which is mounted on the cylindrical mounting part 211. The hose connecting port 213 extends obliquely rearward from the outer surface of the small-diameter cylindrical part 211a, and a dust collecting hose 215 (see FIG. 1) which is used for connection with a dust collector (not shown) is connected to the hose connecting port 213. The dust collecting hose 215 is bound to the motor housing 106 with a banding band 217 in order to be prevented from interfering with the operation. Further, at least during operation, the other end of the dust collecting hose 215 is directly connected to a dust collector (not shown) or connected to a hose on the dust collector side. It is not essential for the dust collecting hose 215 to be connected to a dust collector which is provided separately from the hammer drill 101. For example, if the hammer drill 101 or the dust collecting device itself has a suction source including a motor and a dust collecting fan to be driven by the motor, the other end of the dust collecting hose 215 may be connected to the suction source. Further, a rubber seal 219 is mounted on the small-diameter cylindrical part 211a rearward of the hose connecting port 213 and serves as a sealing member for sealing a clearance between an inner circumferential surface of the small-diameter cylindrical part 211a and an outer circumferential surface of the hammer bit 119.

The dust collecting hood 221 for use in drilling operation is now explained. As shown in FIG. 2, the dust collecting hood 221 for use in drilling operation mainly includes an accordion bit covering part 223 that covers the hammer bit 119 and has front and rear open ends in the longitudinal direction, and a connecting ring 227 that is mounted to the bit covering part 223 by fitting into a front or rear opening 225 of the bit covering part 223. The bit covering part 223 and the connecting ring 227 are features that correspond to the "tool bit covering part" and the "fitting part", respectively, according to this invention. Further, the bit covering part 223 is made of rubber or synthetic resin, and the inner diameter of the front and rear openings 225 is substantially equal to the inner diameter of valleys of the bit covering part 223. Further, a circumferentially extending annular recess 225a (see FIG. 4) is formed in each of the front and rear openings 225 and recessed outward.

In order to attach the dust collecting hood 221 for use in drilling operation to the cylindrical mounting part 211, one (rear) opening 225 of the bit covering part 223 is fitted onto the small-diameter cylindrical part 211a of the cylindrical mounting part 211. When the opening 225 of the bit covering part 223 is fitted onto the small-diameter cylindrical part 211a, the annular recess 225a is elastically engaged with a circumferential ridge 212 formed on the outer surface of the small-diameter cylindrical part 211a, by utilizing elastic deformation of the opening 225. Thus, the dust collecting hood 221 is prevented from becoming easily detached from the cylindrical mounting part 211, but it is allowed to be removed when an external force is applied linearly with respect to the direction of removal or with a twist.

Figure 5:
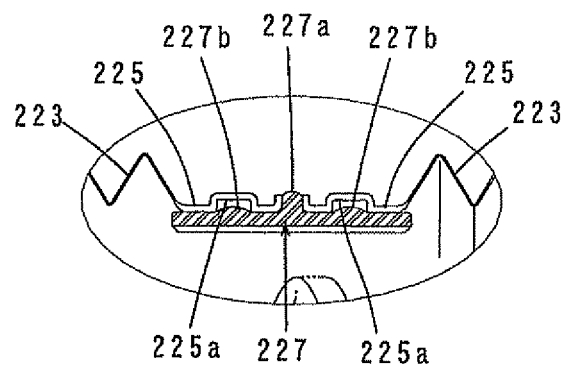
FIG. 5 is an enlarged view of part B in FIG. 3.
Figure 6:
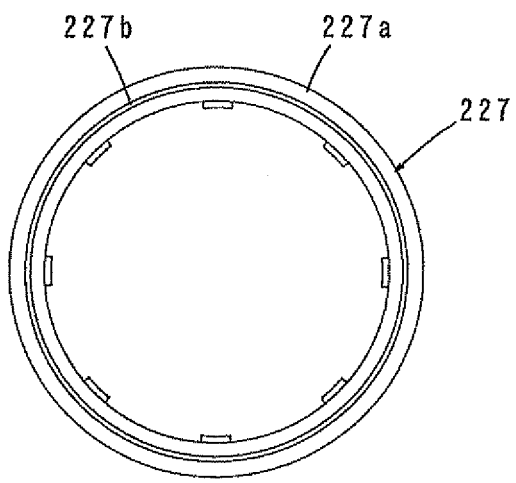
FIG. 6 is a front view showing a connecting ring.

As shown in FIGS. 5 and 6, a flange-like stopper protrusion 227a is formed on the middle of the outer surface of the connecting ring 227 in the longitudinal direction and protrudes outward. The stopper protrusion 227a serves to define the length (depth) of insertion of the connecting ring 227 into the bit covering part 223. Further, circumferential engagement protrusions 227b are formed on the front and rear sides of the stopper protrusion 227a on the outer surface of the connecting ring 227. The amount of protrusion of the engagement protrusions 227b is smaller than that of the stopper protrusion 227a. In order to connect the connecting ring 227 to the bit covering part 223, a rear half of the connecting ring 227 is fitted into the other (front) opening 225 of the bit covering part 223. At this time, the rear engagement protrusion 227b of the connecting ring 227 is elastically engaged with the annular recess 225a of the opening 225 by utilizing elastic deformation of the opening 225. Thus, the connecting ring 227 is prevented from becoming easily detached from the bit covering part 223.

In this manner, the dust collecting hood 221 attached to the cylindrical mounting part 211 is arranged to surround the hammer bit 119, and has a length long enough to cover the entire hammer bit (drill) 119 for use in drilling operation, including a bit tip 119a, as shown in FIG. 2. Specifically, a drilling operation of the hammer drill 101 is performed with the front end of the connecting ring 227 being pressed against the surface of the workpiece. Dust generated during drilling operation is sucked from a suction port in the form of an opening of the connecting ring 227 into a dust collecting passage in the form of an inner space 222 of the dust collecting hood 221 which is formed by the connecting ring 227 and the bit covering part 223. The dust is then led from the inner space 222 into a dust collector through the hose connecting port 213 of the cylindrical mounting part 211 and the dust collecting hose 215 and collected in the dust collector. The accordion type bit covering part 223 contracts when pushed by the workpiece as drilling of the hammer bit 119 proceeds, so that the dust collecting effect can be maintained.

Figure 3:
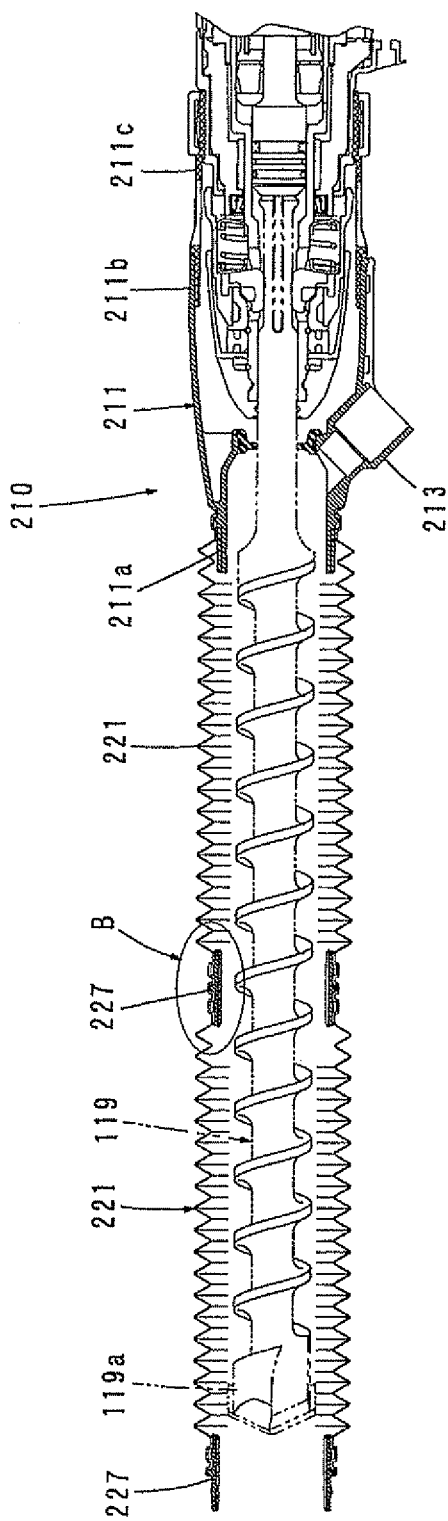
FIG. 3 is a sectional view showing the entire structure of the dust collecting device for drilling operation, having a dust collecting part formed by connecting two dust collecting part components.

In drilling operation, hammer bits 119 of different lengths are used according to the operation. In view of this fact, in this embodiment, a plurality of the dust collecting hoods 221 for drilling operation are provided in identical shape and construction and designed to be connectable with each other so as to be adapted to various lengths of the hammer bits 119. Specifically, when a short hammer bit (short bit) 119 is used, as shown in FIG. 2, one dust collecting hood 221 is used, and when a long hammer bit (long bit) 119 is used, as shown in FIG. 3, two dust collecting hoods 221 are connected in use. When using the two connected dust collecting hoods, in order to connect the second dust collecting hood 221 on the front, the rear opening 225 of the bit covering part 223 of the second dust collecting hood 221 is fitted onto the front half of the connecting ring 227 of the first dust collecting hood 221 attached to the cylindrical mounting part 211. At this time, the front engagement protrusion 227b of the connecting ring 227 is elastically engaged with the annular recess 225a of the opening 225 by utilizing elastic deformation of the opening 225. Thus, the axial length of the dust collecting part formed by the two dust collecting hoods 221 can be set to correspond to the length of the hammer bit 119 to be used.

The form in which the dust collecting part is formed by one dust collecting hood 221 in order to be used with the short hammer bit 119 as shown in FIG. 2 corresponds to the "first form" in this invention. The form in which the dust collecting part is formed by two connected dust collecting hoods 221 in order to be used with the long hammer bit 119 as shown in FIG. 3 corresponds to the "second form" in this invention.

Thus, according to this embodiment, a plurality of dust collecting part components in the form of the dust collecting hoods 221 each including the bit covering part 223 for drilling operation and the connecting ring 227 can be connected to each other. By provision of this construction, either the form in which one dust collecting hood 221 is attached to the cylindrical mounting part 211 or the form in which a plurality of (two) collecting hoods 221 are connected and attached to the cylindrical mounting part 211 can be selected, so that the dust collecting device 210 for drilling operation can be adapted to different lengths of the hammer bits 119 without causing degradation in dust collecting ability.

Further, in this embodiment, the connecting ring 227 has a wall thickness thicker than the accordion part forming the bit covering part 223 and thus has a higher hardness. Thus, the connecting ring 227 can be used as a member for guiding and protecting the accordion bit covering part 223 with respect to the hammer bit 119. When the plurality of dust collecting hoods 221 are connected and used in an elongate form extending in the axial direction as shown in FIG. 3, for example, in a drilling operation which is performed on a vertical wall with the dust collecting hoods 221 placed in a horizontal position, the connecting ring 227 which connects the two bit covering parts 223 effectively functions as a reinforcing member to prevent the bit covering parts 223 from deforming (hanging down) under their own weight. Further, the connecting ring 227 on the front end of the bit covering part 223 avoids the bit covering part 223 from interfering with the hammer bit 119 and the workpiece and thus protects the bit covering part 223.

Further, in this embodiment, the dust collecting hoods 221 have the same shape. Therefore, when the bit covering parts 223 of the dust collecting hoods 221 are formed, for example, by using a "mold", they can be formed by using the same molds, so that the manufacturing costs can be reduced.

Figure 7:
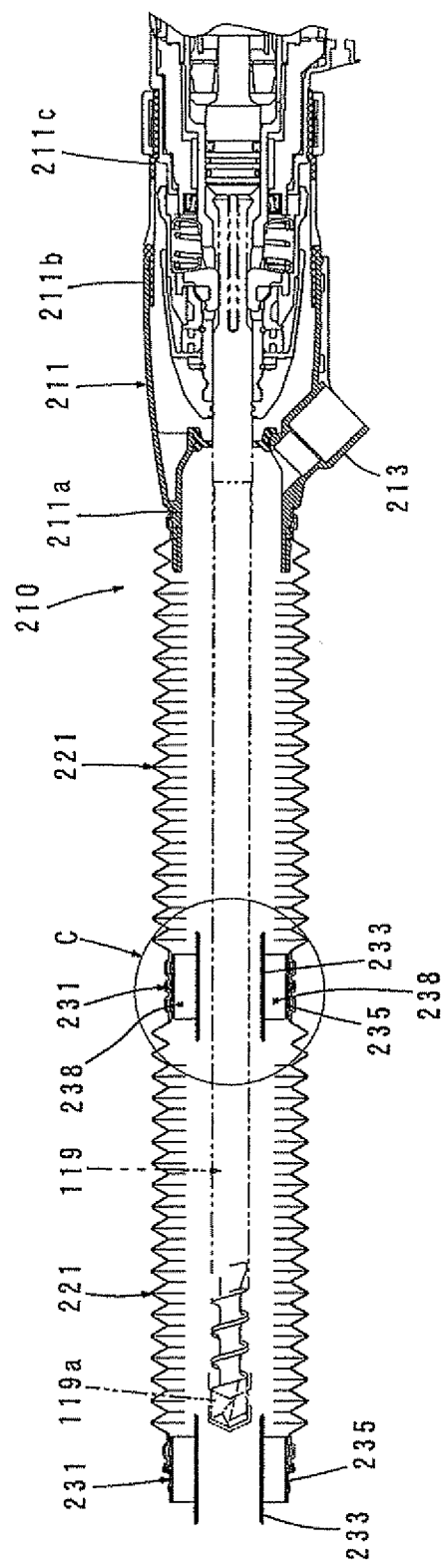
FIG. 7 is a sectional view showing the dust collecting device having a dust collecting part formed by connecting two dust collecting part components via a connecting ring for a small diameter which is a modification of the connecting ring.

Further, the hammer bits 119 for drilling operation are available not only in different lengths but in different outside diameters. In view of this fact, as shown in FIG. 7, the dust collecting device 210 of this embodiment is provided with a connecting ring 231 for a small diameter so as to be used with a hammer bit 119 having a small outside diameter. Thus, the above-described connecting ring 227 and the connecting ring 231 for a small diameter can be used according to the outside diameter of the hammer bit for drilling operation. The connecting ring 231 for a small diameter is a feature that corresponds to the "fitting part" according to this invention.

Figure 8:
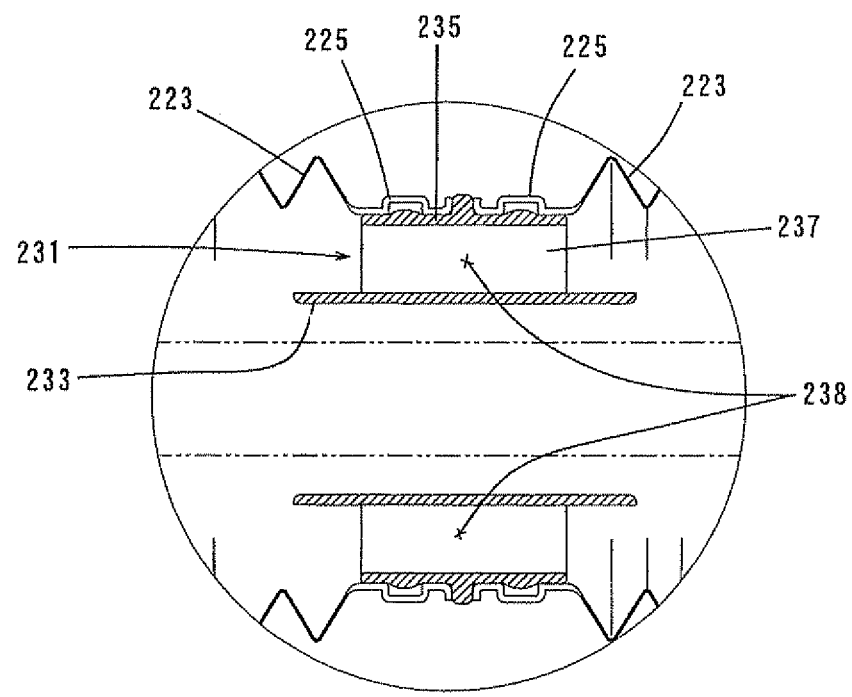
FIG. 8 is an enlarged view of part C in FIG. 7.
Figure 9:
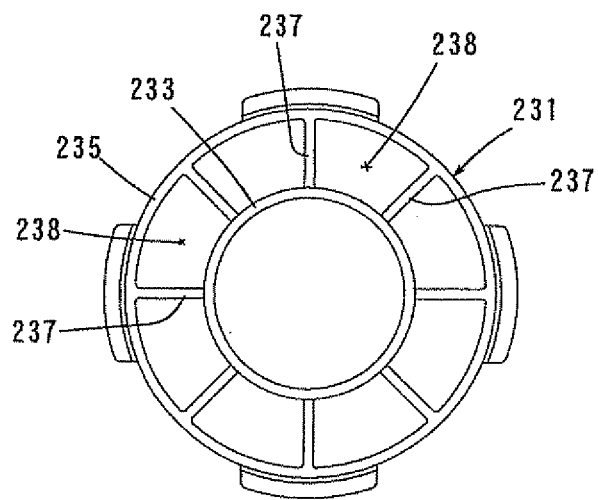
FIG. 9 is a front view showing the connecting ring for a small diameter.

As shown in FIGS. 8 and 9, the connecting ring 231 for a small diameter has an inner ring 233, an outer ring 235 which is coaxially arranged on the outside of the inner ring 233 with a predetermined clearance, and radial spokes 237 which connect the inner and outer rings. Thus, a space 238 is provided between the outer circumferential surface of the inner ring 238 and the inner circumferential surface of the outer ring 235 and partitioned by the spokes 237. The space 238 forms a dust collection passage. The inside diameter of the inner ring 233 is smaller than the inside diameter of the accordion part of the bit covering part 223 and closer to the outside diameter of the hammer bit 119. The structure of fitting the outer ring 235 into the bit covering part 223 is substantially identically formed with that of the above-described connecting ring 227, and therefore its description is omitted.

The connecting ring 231 constructed as described above for a small diameter can be applied to both a drilling operation with a short hammer bit 119 and a drilling operation with a long hammer bit 119. FIG. 7 shows two dust collecting hoods 221 connected to be used with the long hammer bit 119. Dust generated during drilling operation can be collected through the space 238 of the connecting ring 231 which forms a dust collecting passage. By provision of the connecting ring 231 for a small diameter which has the space 238 between the inner ring 233 and the outer ring 235, the inner circumferential surface of the inner ring 233 can be placed in contact with or closer to the outer circumferential surface of the hammer bit 119. Therefore, the dust collecting effect is maintained by the space 238, and the inner circumferential surface of the inner ring 233 can be utilized as a guide for the dust collecting hood 221 with respect to the hammer bit 119, so that the stability of the dust collecting hood 221 can be achieved.

The dust collecting hood 241 for use in chipping operation is now explained with reference to FIGS. 10 to 13. As described above, the dust collecting hood 241 for chipping operation is attached to the cylindrical mounting part 211 by replacement with the dust collecting hood 221 for drilling operation. Therefore, the cylindrical mounting part 211 is used as a common member for drilling operation and chipping operation.

The dust collecting hood 241 for chipping operation is a cylindrical member having a longitudinal length such that the tip 119a of the hammer bit (chisel) 119 for chipping operation protrudes a predetermined length (long enough to be reliably kept visible) from the front end of the dust collecting hood 241 attached to the cylindrical mounting part 211. The length of the dust collecting hood 241 for chipping operation is kept unchanged during chipping operation. The dust collecting hood 241 for chipping operation is made of rubber or synthetic resin and mainly includes a bit covering part 243 which surrounds the hammer bit 119 and front and rear connecting parts 245, 247 integrally formed on both ends of the bit covering part 243 in the longitudinal direction. The bit covering part 243 and the connecting parts 245, 247 are features that correspond to the "tool bit covering part" and the "fitting part", respectively, according to this invention.

Figure 12:
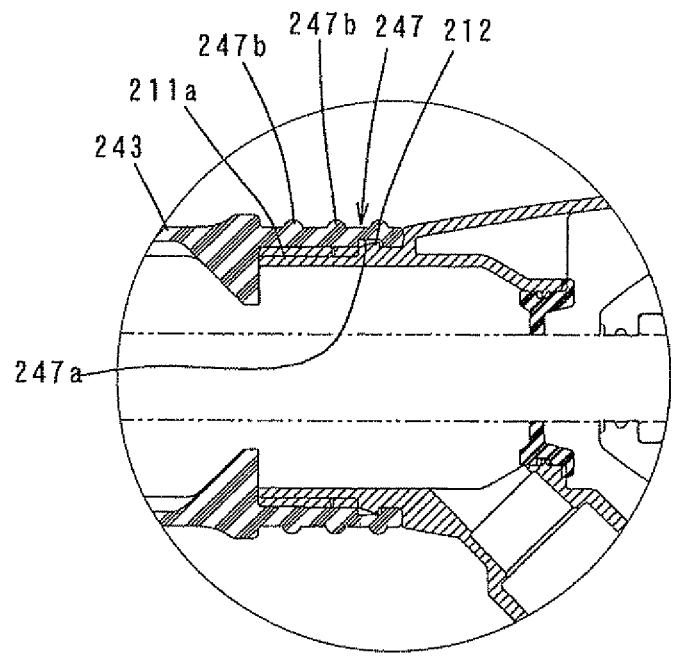
FIG. 12 is an enlarged view of part D in FIG. 10.
Figure 13:
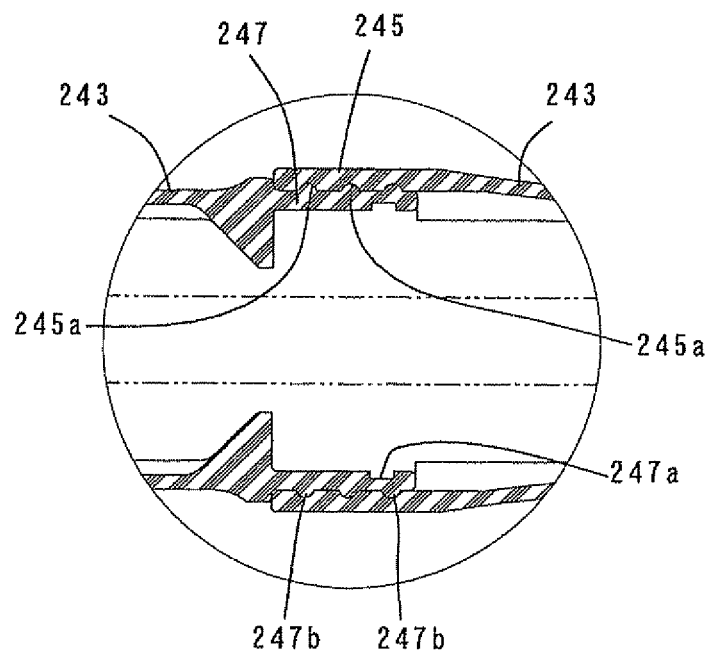
FIG. 13 is an enlarged view of part E in FIG. 11.

As shown in FIG. 12, the rear connecting part 247 of the dust collecting hood 241 has an annular recess 247a formed in its inner surface and extending in the circumferential direction, and a plurality of annular engagement protrusions 247b formed on its outer surface at predetermined intervals in the longitudinal direction and extending in the circumferential direction. As shown in FIG. 13, the front connecting part 245 has a plurality of annular grooves 245a formed in its inner surface and shaped to conform to the engagement protrusions 247b of the rear connecting part 247. A plurality of the dust collecting hoods 241 constructed as described above are provided in identical shape and construction. The rear connecting part 247 and the front connecting part 245 are features that correspond to the "first fitting part" and the "second fitting part", respectively, according to this invention.

In order to attach the dust collecting hood 241, as shown in FIG. 12, the rear connecting part 247 is fitted onto the front end of the small-diameter cylindrical part 211a of the cylindrical mounting part 211. At this time, the annular recess 247a of the rear connecting part 247 is elastically engaged with the ridge 212 of the small-diameter cylindrical part 211a by utilizing elastic deformation of the connecting part 247. Thus, the dust collecting hood 241 is prevented from becoming easily detached from the cylindrical mounting part 211, but it is allowed to be removed when an external force is applied linearly with respect to the direction of removal or with a twist. The engagement protrusions 247b are exposed on the outer surface of the connecting part 247 fitted on the small-diameter cylindrical part 211a when the dust collecting hood 241 is attached to the cylindrical mounting part 211. Thus, the outer surface of the rear connecting part 247 is exposed in the form of a grooved part and forms a subgrip to be held by a user. Therefore, the user can operate the hammer drill 101 while holding the handgrip 109 with one hand and the grooved outer surface of the connecting part 247 with the other hand. At this time, the grooved outer surface functions as a nonslip grip, so that the operability can be increased.

Figure 10:
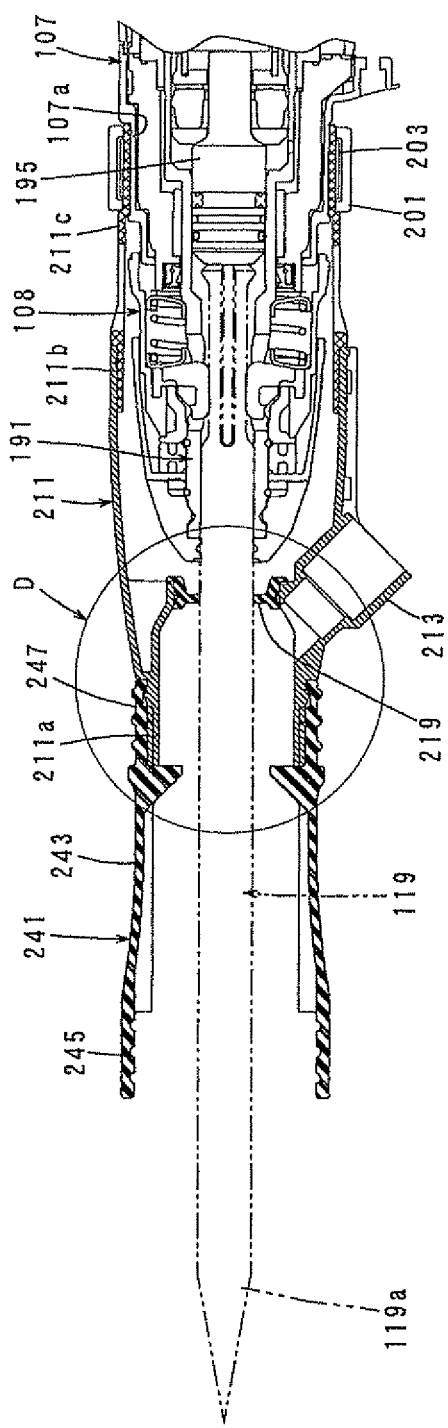
FIG. 10 is a sectional view showing the entire structure of the dust collecting device for chipping operation, having a dust collecting part formed by one dust collecting part component.
Figure 11:
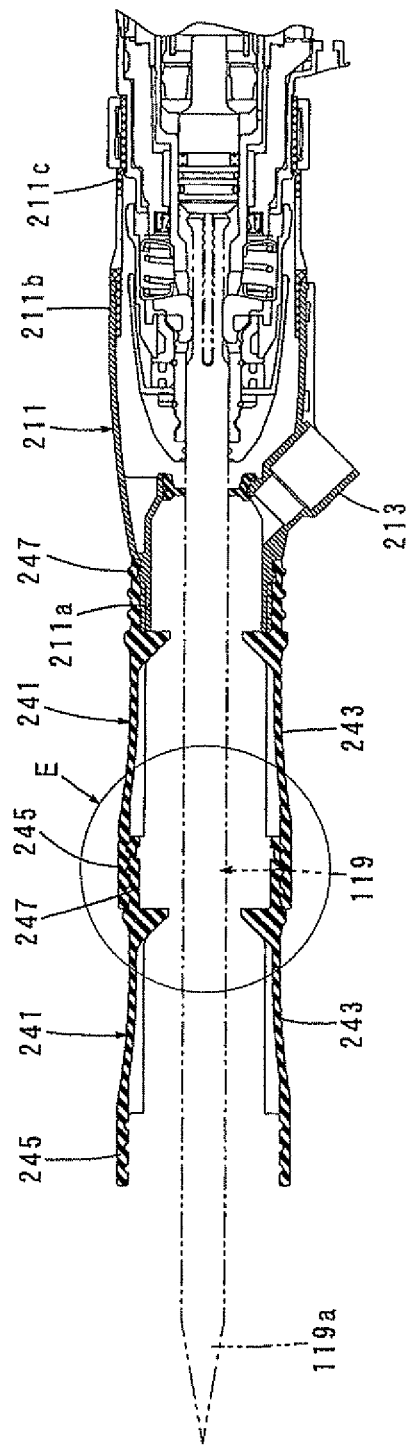
FIG. 11 is a sectional view showing the entire structure of the dust collecting device for chipping operation, having a dust collecting part formed by connecting two dust collecting part components.

When the dust collecting hood 241 for chipping operation is used to collect dust, in a chipping operation using a short hammer bit 119, as shown in FIG. 10, one dust collecting hood 241 is used to form the dust collecting part, and in a chipping operation using a long hammer bit 119, as shown in FIG. 11, two dust collecting hoods 241 are connected to form the dust collecting part. Specifically, according to this embodiment, in chipping operation, like in drilling operation, the dust collecting hood can be adapted to various lengths of the hammer bits 119 without causing degradation in dust collecting ability. In order to connect the dust collecting hoods 241, as shown in FIG. 13, the rear connecting part 247 of one dust collecting hood 241 is fitted into the front connecting part 245 of the other dust collecting hood 241. At this time, the engagement protrusion 247b of the rear connecting ring 247 is elastically engaged with the annular recess 245a of the front connecting ring 245. Thus, the two dust collecting hoods 241 can be securely connected together.

In the above-described embodiment, as an example of a power tool, the hammer drill 101 is described which can be switched between hammering mode in which the hammer bit 119 performs hammering movement and hammer drill mode in which the hammer bit 119 performs hammering movement in the axial direction and drilling movement in the circumferential direction. Further, the dust collecting device 210 is described as being applicable to drilling operation and chipping operation by replacing the dust collecting hood 221 for drilling operation and the dust collecting hood 241 for chipping operation which are components of the dust collecting device 210, with each other. When this invention is applied to other power tools, such as an electric drill in which the hammer bit 119 performs only rotation in the circumferential direction, however, the dust collecting device is designed for use in drilling operation (and the dust collecting hood 241 for chipping operation is not provided). When this invention is applied to an electric hammer in which the hammer bit 119 performs only hammering movement in the axial direction, the dust collecting device is designed for use in hammering operation (and the dust collecting hood 221 for drilling operation is not provided).

Further, as for each of the dust collecting hood 221 for drilling operation and the dust collecting hood 241 for chipping operation, a plurality of the dust collecting hoods 221, 241 may have different lengths in the axial direction. Further, in this embodiment, the two dust collecting hoods 221, 241 are described as being connected, but three or more dust collecting hoods may be connected together.

In accordance with the above-described aspect of the invention, following feature can be provided.

"A dust collecting device, which is attached to a power tool that performs a predetermined operation on a workpiece by driving a tool bit coupled to a front end region of a tool body, and collects dust generated by operation, comprising:

a dust collecting part that covers the tool bit over a predetermined range in the axial direction and collects dust generated by operation, wherein the dust collecting part is formed in one of a first form and a second form which is arbitrarily selected, and in the first form, the dust collecting part is formed by a dust collecting part component which has a tool bit covering part having a predetermined inside diameter and a fitting part connected to the tool bit covering part, while, in the second form, the dust collecting part is formed by connecting a plurality of the dust collecting part components via the fitting part in the axial direction, whereby the dust collecting part can be adapted to various lengths of the tool bits without causing degradation in dust collecting ability."

Second Embodiment of the Invention

Figure 14:
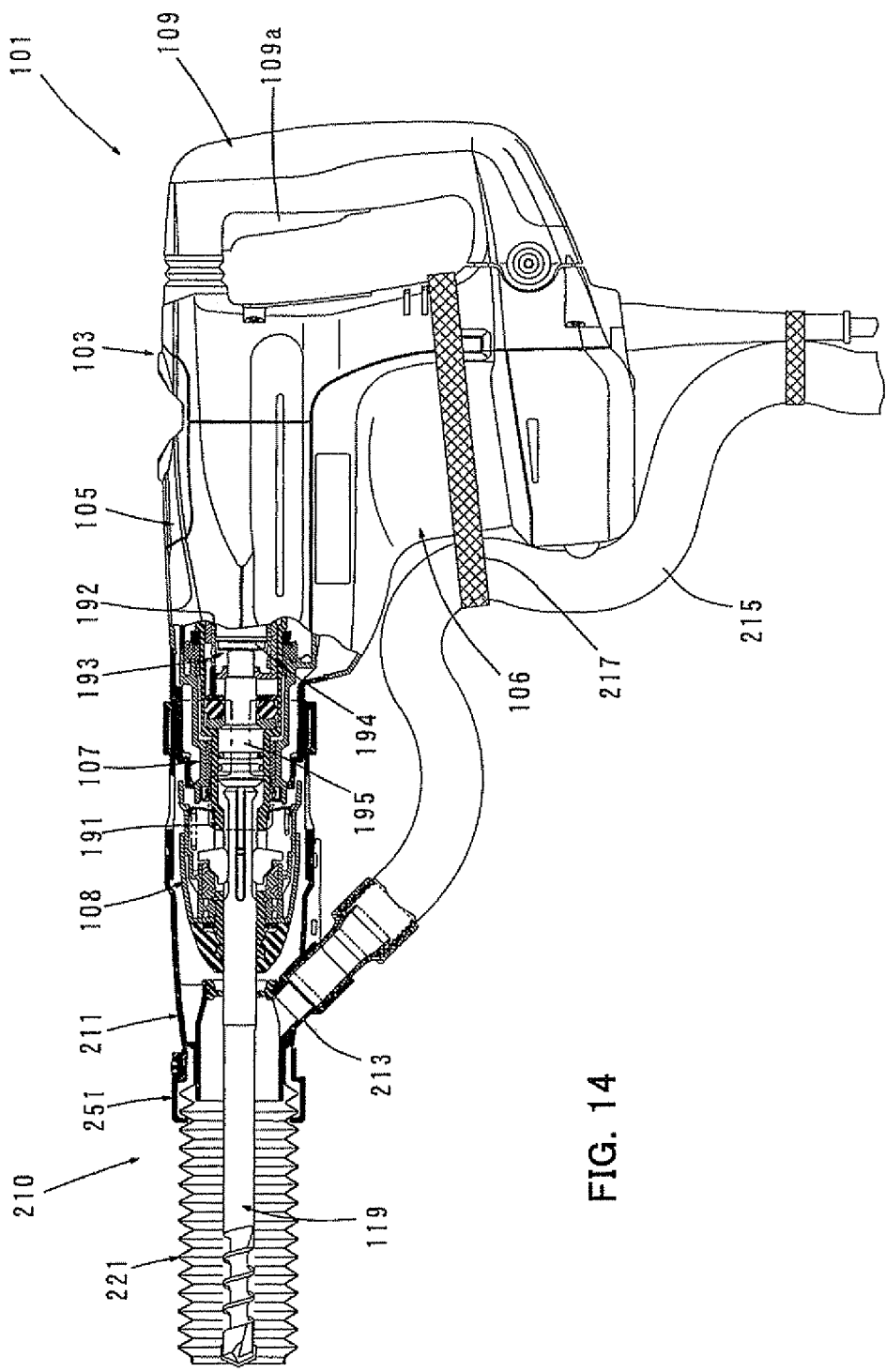
FIG. 14 is a side view, partly in section, showing an entire structure of a hammer drill to which a dust collecting device for use in drilling operation according to a second embodiment of the invention is attached.

A dust collecting device according to a second embodiment of the invention is now described with reference to FIGS. 14 to 20. This embodiment is explained as being applied to an electric hammer drill which is a representative example of a power tool. FIG. 14 shows a hammer drill 101 with an auxiliary handle in the form of a side grip 201 (only partly shown in the drawing) and a dust collecting device 210 attached thereto. The construction of the hammer drill 101 is now briefly explained mainly with reference to FIG. 14.

The hammer drill 101 mainly includes a body 103 that forms an outer shell of the hammer drill 101, an elongate hammer bit 119 detachably coupled to a tip end region (on the left as viewed in FIG. 14) of the body 103 via a tool holder 191, and a main handle in the form of a handgrip 109 that is connected to the body 103 on the side opposite the hammer bit 119 and designed to be held by a user. The body 103 and the hammer bit 119 are features that correspond to the "tool body" and the "tool bit", respectively, according to the invention. The hammer bit 119 is inserted into a bit insertion hole of the tool holder 191 and held by a chuck 108 such that it is allowed to reciprocate with respect to the tool holder in its axial direction and prevented from rotating with respect to the tool holder in its circumferential direction. For the sake of convenience of explanation, the side of the hammer bit 119 is taken as the front and the side of the handgrip 109 as the rear.

The body 103 mainly includes a motor housing 106 that houses a driving motor (not shown), a crank housing 105 that houses a motion converting mechanism (not shown), a striking mechanism 193 and a power transmitting mechanism (not shown), and a generally cylindrical barrel 107 connected to a front of the crank housing 105. Rotating power of the driving motor is appropriately converted into linear motion by the motion converting mechanism which mainly includes a crank mechanism, and then transmitted to the striking mechanism 193. As a result, an impact force is generated in the axial direction of the hammer bit 119 via the striking mechanism 193. Further, the speed of the rotating power of the driving motor is appropriately reduced by the power transmitting mechanism which mainly includes a plurality of gears, and then transmitted to the hammer bit 119 via a final shaft in the form of the tool holder 191, so that the hammer bit 119 is caused to rotate in its circumferential direction. The driving motor 111 is driven when a user depresses a trigger 109*a* disposed on the handgrip 109.

The striking mechanism 193 mainly includes a striking element in the form of a striker 194 which is slidably disposed within a bore of a cylinder 192 together with a piston of the crank mechanism, and an intermediate element in the form of an impact bolt 195 which is slidably disposed in the tool holder 191. The striker 194 is linearly driven via an air spring action (pressure fluctuations) of an air chamber of the cylinder 192 which is caused by sliding movement of the piston. Then the striker 194 collides with (strikes) the impact bolt 195 and a striking force is transmitted to the hammer bit 119 via the impact bolt 195.

Further, the hammer drill 101 can be appropriately switched between hammering mode for chipping operation which is performed on a workpiece by applying only a striking force to the hammer bit 119 in the axial direction, and hammer drill mode for drilling operation which is performed on a workpiece by applying a striking force in the axial direction and a rotating force in the circumferential direction. This technique is well known in the art and not directly related to the invention, and therefore its further description is omitted.

A dust collecting device 210 is now explained with reference to FIGS. 15 to 20. The dust collecting device 210 is attached to the hammer drill 101 having the above-described construction and serves to suck and collect dust generated during operation on a workpiece (such as concrete). The dust collecting device 210 according to this embodiment mainly includes a dust cover in the form of a synthetic resin cylindrical mounting part 211 which is removably attached to the barrel 107 of the hammer drill 101 together with the side grip 201, and an extendable dust collecting hood 221 (see FIGS. 2 and 3) for use in drilling operation. The dust collecting hood 221 can be removably attached to a front end of the cylindrical mounting part 211 and is constructed to be able to change its length in the longitudinal direction. The cylindrical mounting part 211 and the dust collecting hood 221 for use in drilling operation are features that correspond to the "fixing part" and the "dust collecting hood", respectively, according to this invention.

Figure 15:
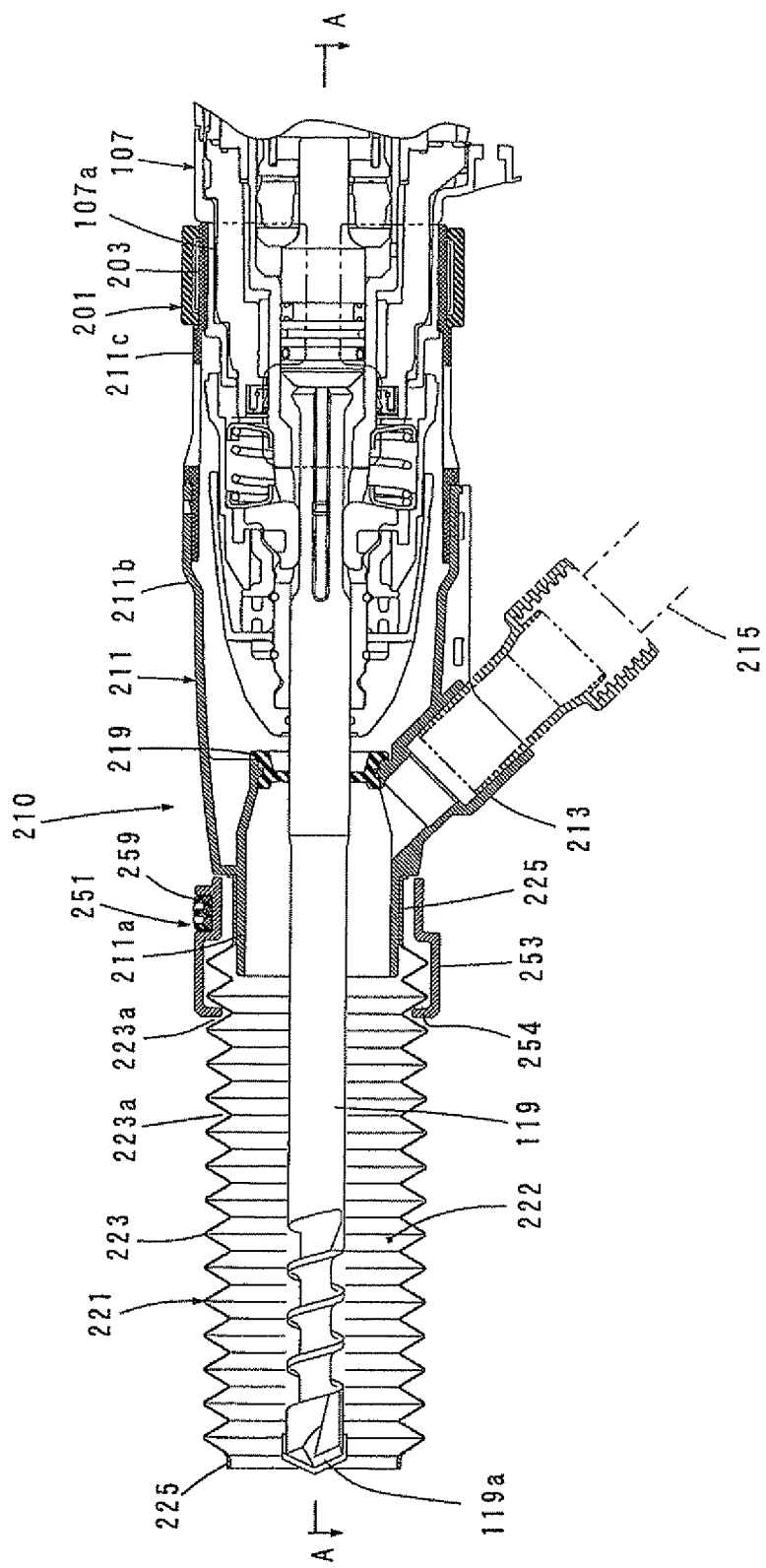
FIG. 15 is a sectional view showing an entire structure of the dust collecting device for use in drilling operation, in a state in which a dust collecting hood is extended to a maximum.
Figure 16:
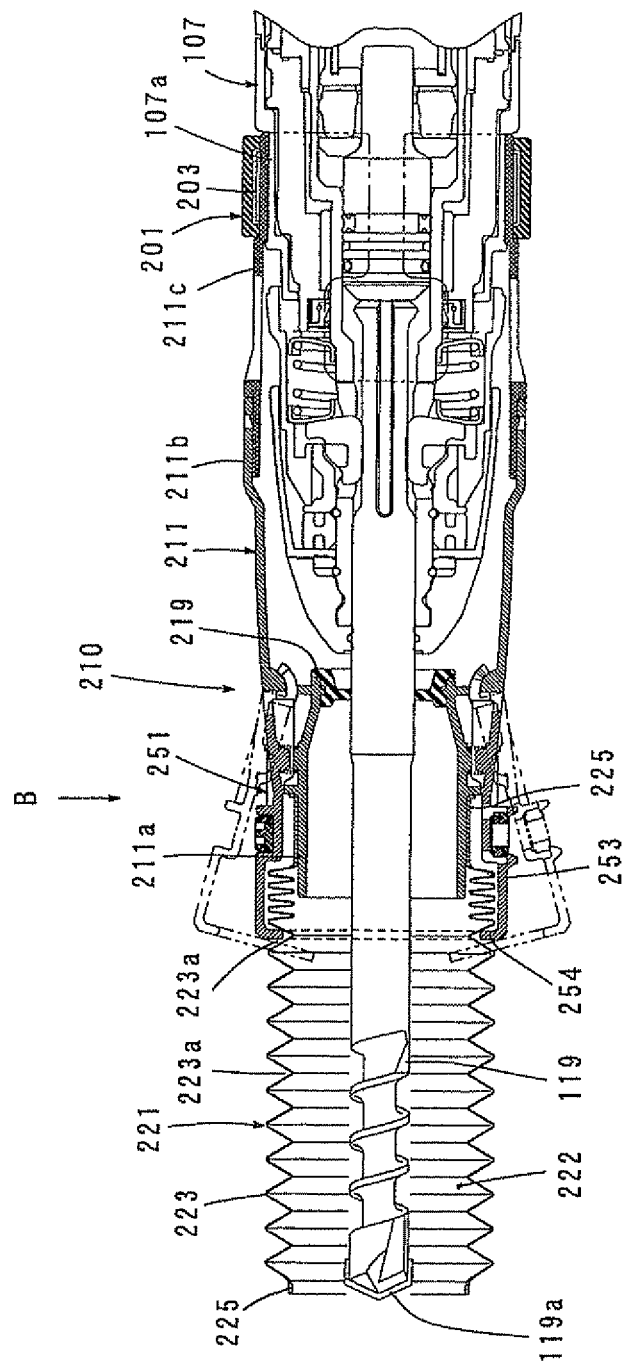
FIG. 16 is a sectional view taken along line A-A in FIG. 15 and showing the dust collecting hood in a contracted state.

As shown in FIGS. 15 and 16, the cylindrical mounting part 211 is a generally cylindrical member extending in the axial direction of the hammer bit and has both ends open in the axial direction. The cylindrical mounting part 211 has a front portion formed by a small-diameter cylindrical part 211*a* on which the dust collecting hood 221 for use in drilling operation can be mounted, and a rear portion formed by a large-diameter cylindrical part 211*b*. Further, a cylindrical part extension 211*c* is formed contiguously to a rear region (on the right as viewed in FIGS. 15 and 16) of the large-diameter cylindrical part 211*b*. The cylindrical part extension 211*c* extends in the axial direction and is split into several portions in the circumferential direction by a plurality of slits (not shown) each having an open rear end, so that it is allowed to elastically deform in the radial direction.

In order to mount the cylindrical mounting part 211 to the barrel 107, the cylindrical mounting part 211 is set to cover the front end portion of the barrel 107 from the front (the left as viewed in FIG. 2) and the cylindrical part extension 211c is fixed by a mounting band 203 for the side grip 201 which is mounted to the barrel 107. The mounting band 203 for the side grip 201 is set to be wrapped around the outer surface of a grip mounting part 107a formed on the barrel 107 and tightened or loosened by using a screw structure (not shown). Specifically, the dust collecting device 210 is fixed together with the side grip 201 on the grip mounting part 107a of the barrel 107 in the body 103 by tightening the cylindrical part extension 211c of the cylindrical mounting part 211 with the mounting band 203.

Further, a hose connecting port 213 (see FIGS. 14 and 15) is formed on the small-diameter cylindrical part 211a of the cylindrical mounting part 211 and communicates with an inner space 222 of the dust collecting hood 221 mounted on the cylindrical mounting part 211. The hose connecting port 213 extends obliquely rearward from the outer lower surface of the small-diameter cylindrical part 211a, and a dust collecting hose 215 which is used for connection with an outside dust collector (not shown) is connected to the hose connecting port 213. The dust collecting hose 215 is bound to the motor housing 106 with a banding band 217 in order to be prevented from interfering with the operation (see FIG. 14). Further, at least during operation, the other end of the dust collecting hose 215 is directly connected to a dust collector (not shown) or connected to a hose on the dust collector side. It is not essential for the dust collecting hose 215 to be connected to a dust collector which is provided separately from the hammer drill 101. For example, if the hammer drill 101 or the dust collecting device itself has a suction source including a motor and a dust collecting fan to be driven by the motor, the other end of the dust collecting hose 215 may be connected to the suction source. Further, a rubber seal 219 is mounted on the small-diameter cylindrical part 211a rearward of the hose connecting port 213 and serves as a sealing member for sealing a clearance between an inner circumferential surface of the small-diameter cylindrical part 211a and an outer circumferential surface of the hammer bit 119.

The dust collecting hood 221 for use in drilling operation is now explained. As shown in FIGS. 15 and 16, the dust collecting hood 221 for use in drilling operation mainly includes an accordion bit covering part 223 that covers the hammer bit 119 and can extend and contract in the longitudinal direction. Further, each of front and rear ends of the bit covering part 223 forms a ring-like opening 225. The accordion bit covering part 223 is made of rubber or synthetic resin and provided as a region which can extend and contract by elastic deformation in the longitudinal direction. Further, the bit covering part 223 is a feature that corresponds to the "elastic region" according to this invention. In order to attach the dust collecting hood 221 constructed as described above to the cylindrical mounting part 211, the rear opening 225 of the bit covering part 223 is fitted onto the small-diameter cylindrical part 211a of the cylindrical mounting part 211 from outside.

The protruding length of the dust collecting hood 221 attached to the cylindrical mounting part 211 and protruding from the body 103 can be changed (adjusted) by contracting and extending some of accordion folds (mountain folds and valley folds) of the accordion bit covering part 223, by elastic deformation, on the side contiguous to the opening 225 fitted onto the small-diameter cylindrical part 211a. FIG. 15 shows a maximum extended state in which all the folds are extended (a free state in which an external force is not applied in the axial direction), and FIG. 16 shows a contracted state in which some folds are contracted by an external force applied in the axial direction. Specifically, in this embodiment, the protruding length of the dust collecting hood 221 protruding from the body 103 can be adjusted by extending and contracting the accordion folds of the bit covering part 223. With such a construction, the length of the dust collecting hood 221 can be adapted to the length of the hammer bit 119 to be used for an operation.

A lock mechanism 251 is provided on the cylindrical mounting part 211 and serves to keep the mounted state of the dust collecting hood 221 mounted to the cylindrical mounting part 211 or to lock the dust collecting hood 221 in a position in which the protruding length of the dust collecting hood 221 protruding from the body 103 is adjusted. The lock mechanism 251 is a feature that corresponds to the "lock mechanism" in this invention. The lock mechanism 251 mainly includes a hook member 253 which is radially engaged with an accordion valley portion 223a from outside and keeps the state of the dust collecting hood 221 after the protruding length of the dust collecting hood 221 protruding from the body 103 is changed, and a retaining member 259 which retains the hook member 253 in engagement with the accordion valley portion 223a.

Figure 4:
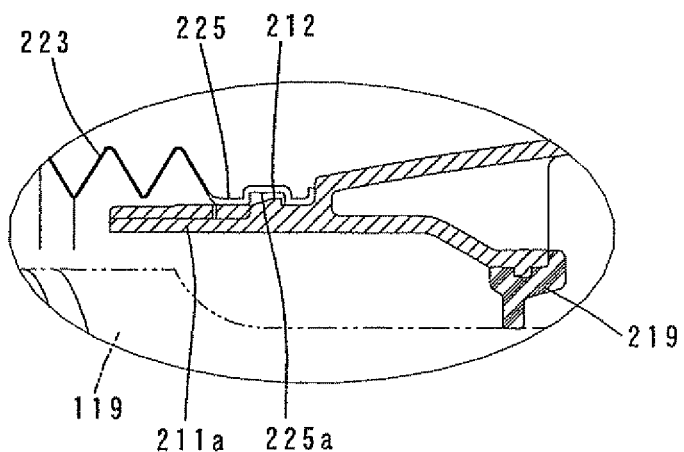
FIG. 4 is an enlarged view of part A in FIG. 2.

As shown in FIGS. 17 to 20, the hook member 253 includes right and left hook halves 253L, 253R which are formed by halving a generally cylindrical member along its axis. Each of the right and left hook halves 253L, 253R has a radially inwardly protruding hook part 254a formed substantially all around one axial end (front end) in the circumferential direction and a protrusion 255 formed substantially in the middle of the other axial end in the circumferential direction and protruding rearward and horizontally in the axial direction. The right and left hook halves 253L, 253R are opposed to each other in such a manner as to cover the rear opening 225 of the dust collecting hood 221, and the small-diameter cylindrical part 211a of the cylindrical mounting part 211 and a rear region of the bit covering part 223 which are connected to the rear opening 225, from outside. In this state, as shown in FIGS. 4 and 5, a protruding end 255a of the protrusion 255 formed on each of the right and left hook halves 253L, 253R is inserted into the bore of the cylindrical mounting part 211 through an opening formed in a connecting region between the small-diameter cylindrical part 211a and the large-diameter cylindrical part 211b of the cylindrical mounting part 211, and rotatably supported by a protruding support part 257 which is formed on an inner surface of the cylindrical part and has a curved outer surface. Specifically, the right and left hook halves 253L, 253R are mounted to the cylindrical mounting part 211 such that the right and left hook halves 253L, 253R can be rotated on the protruding support part 257 of the cylindrical mounting part 211 in a direction (radial direction) transverse to the axial direction of the hammer bit 119 so as to open and close to the right and left on the hook part 254 side. An engagement surface (contact surface) of the protrusion 255 with the protruding support part 257 has a concave curved surface, so that smoother rotation of the right and left hook halves 253L, 253R can be realized.

When the right and left hook halves 253L, 253R are radially inwardly rotated and butt-joined each other, or when they are closed, the hook member 253 forms a generally cylindrical member. In this state, the hook part 254 is engaged with one of the valley portions 223a of the dust collecting hood 221 from outside and thus holds the dust collecting hood 221 in the state mounted to the cylindrical mounting part 211. On the other hand, when the right and left hook halves 253L, 253R are rotated radially outward and opened (as shown by two-dot chain line in FIG. 17), the hook part 254 is disengaged from the valley portion 223a of the bit covering part 223. In this state, the protruding length of the dust collecting hood 221 protruding from the body 103 can be adjusted in the axial direction of the hammer bit.

Figure 17:
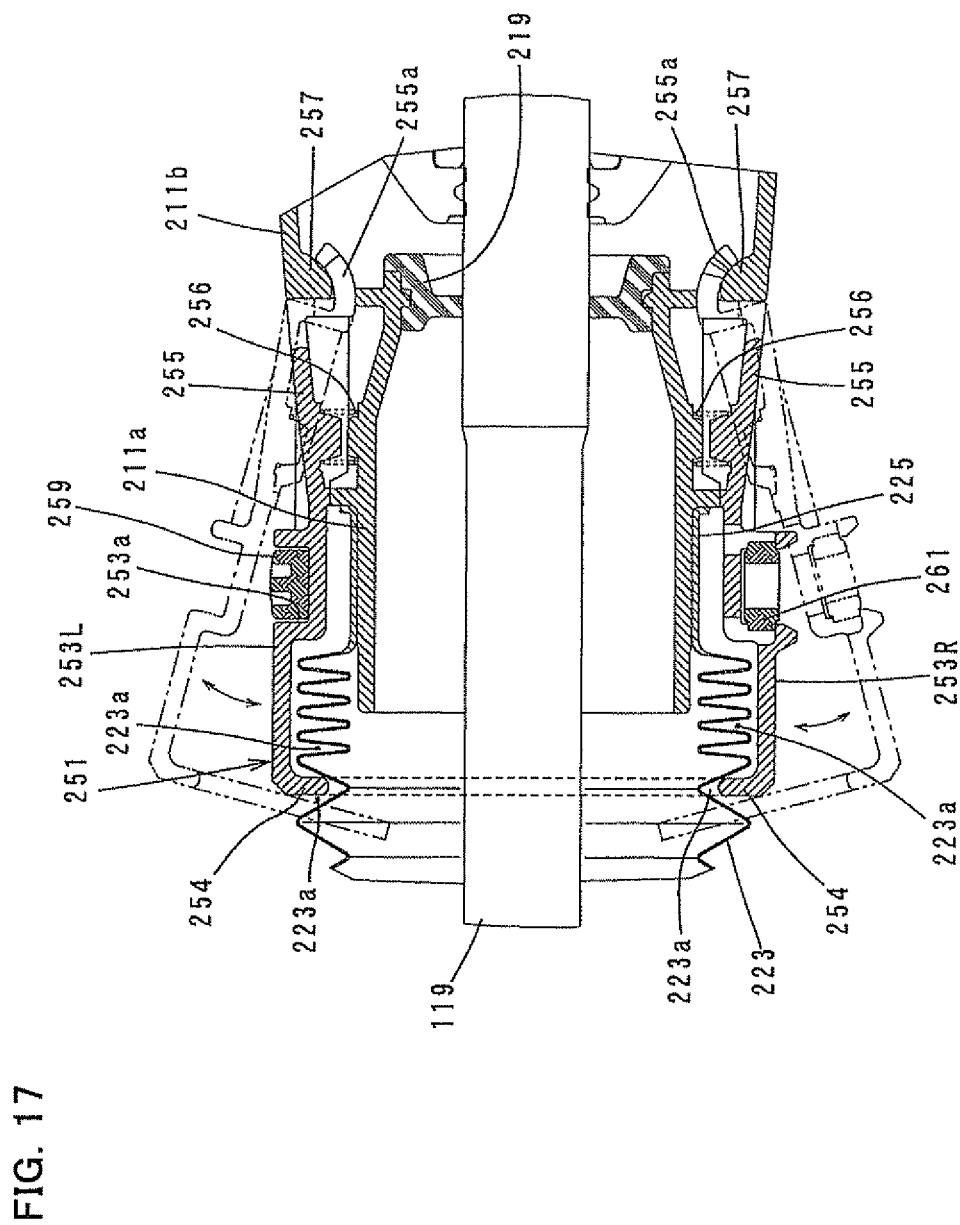
FIG. 17 is an enlarged view of part of FIG. 16.
Figure 18:
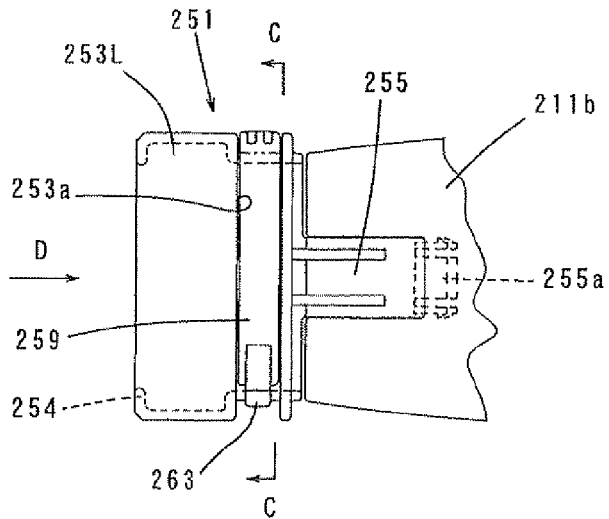
FIG. 18 is a view as viewed from the direction of the arrow B in FIG. 16.

Further, the right and left hook halves 253L, 253R are constantly biased in an open direction (in a direction of disengagement of the hook part 254 from the valley portion 223a) by a biasing member in the form of a coil spring 256. As shown in FIG. 17, the coil spring 256 is disposed between an inner surface of the protrusion 255 and an outer surface of the small-diameter cylindrical part 211a and biases the right and left hook halves 253L, 253R such that they rotate outwardly.

Figure 19:
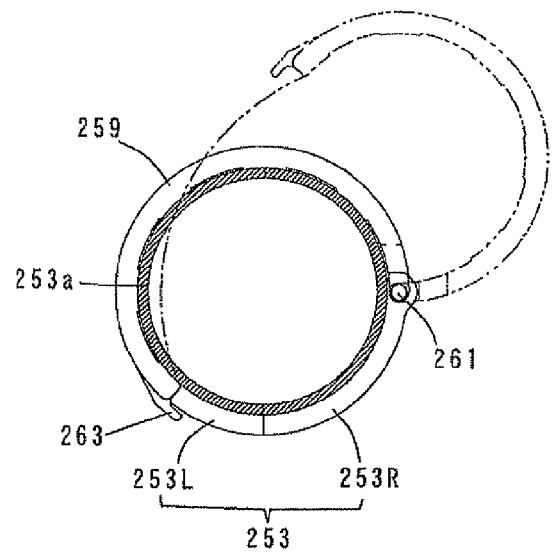
FIG. 19 is a sectional view taken along line C-C in FIG. 18.
Figure 20:
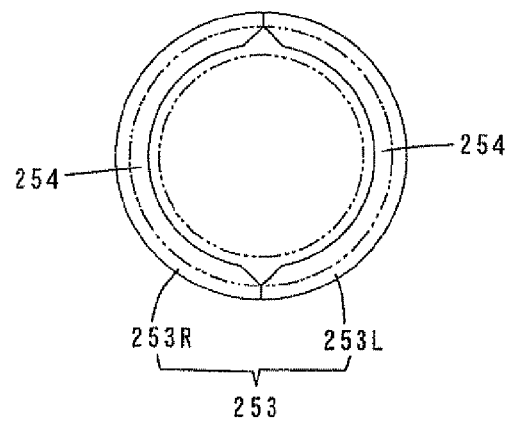
FIG. 20 is a view as viewed from the direction of the arrow D in FIG. 18.

As shown in FIG. 19, the retaining member 259 is designed as a ring-like member in the form of a slightly longer arc than a semicircle, or a major arc, and its one end in the circumferential direction is fastened to one of the right and left hook halves 253L, 253R by a shaft 261 such that it can rotate around an axis parallel to the axis of the hammer bit 119. In a state in which the right and left hook halves 253L, 253R are closed against the biasing force of the coil spring 256, or in which the hook part 254 is engaged with any one of the valley portions 223a of the bit covering part 223, the retaining member 259 is fitted on (wrapped around) both of the right and left hook halves 253L, 253R from outside and thus retains the right and left hook halves 253L, 253R in the closed state. The retaining member 259 can be fitted on the right and left hook halves 253L, 253R while elastically deforming in a direction that widens its ring diameter. Thereafter, the retaining member 259 elastically returns to an original form and retains the right and left hook halves 253L, 253R in the closed state against the biasing force of the coil spring 256.

A releasing tab 263 (see FIGS. 18 and 19) is provided on the other end of the retaining member 259 in the circumferential direction. In the state in which the retaining member 259 is fitted on the right and left hook halves 253L, 253R, a user can turn the retaining member 259 while elastically deforming the retaining member in the direction that widens its ring diameter, by pulling the tab 263 radially outward (leftward as viewed in FIG. 19) with a fingertip. In this manner, the user can easily release the retaining member 259. Further, the retaining member 259 is designed to be fitted in a circumferentially extending annular groove 253a formed in an outer surface of the right and left hook halves 253L, 253R. In the fitted state, an outer surface of the retaining member 259 is flush with the outer surface of the right and left hook halves 253L, 253R (see FIG. 17).

The dust collecting device 210 according to this embodiment is constructed as described above. As shown in FIGS. 15 and 16, the dust collecting hood 221 is attached in use to the cylindrical mounting part 211 such that it covers the entire hammer bit (drill) 119 for use in drilling operation, including the bit tip 119a. Specifically, a drilling operation of the hammer drill 101 is performed with the front end of the dust collecting hood 221 being pressed against the surface of the workpiece. Dust generated during drilling operation is sucked from a suction port in the form of a front end opening of the dust collecting hood 221 into a dust collecting passage in the form of an inner space 222 of the dust collecting hood 221. The dust is then led from the inner space 222 into a dust collector through the hose connecting port 213 of the cylindrical mounting part 211 and the dust collecting hose 215 and collected in the dust collector. The accordion bit covering part 223 gradually contracts when the front end of the bit covering part 223 is pushed by the workpiece as drilling of the hammer bit 119 proceeds, so that the dust collecting effect can be maintained.

In drilling operation, hammer bits 119 of different lengths are used according to the operation. According to this embodiment, for example, when a long hammer bit 119 is used, as shown in FIG. 15, the dust collecting hood 221 can be adjusted to have a length long enough to cover the bit tip 119a of the hammer bit 119 by extending all of the accordion folds of the bit covering part 223. On the other hand, when a short hammer bit 119 is used, as shown in FIG. 16, the dust collecting hood 221 can be adjusted to have a length long enough to cover the bit tip 119a of the hammer bit 119 by contracting some of the accordion folds on the side of the small-diameter cylindrical part 211a of the cylindrical mounting part 211. Specifically, according to this embodiment, the dust collecting device 210 for use in drilling operation can be adapted to the hammer bits 119 of different lengths without causing degradation in dust collecting ability.

In this embodiment, the protruding length of the dust collecting hood 221 protruding from the body 103 is adjusted to be adapted to the length of the hammer bit 119, and thereafter, the hook part 254 of the hook member 253 is engaged with arbitrarily selected one of the valley portions 223a of the accordion part forming the bit covering part 223. Thus, the mounted state of the dust collecting hood 221 with respect to the cylindrical mounting part 211 is maintained. Specifically, according to this embodiment, by engaging the hook part 254 of the hook member 253 with arbitrarily selected one of the accordion valley portions 223a, the dust collecting hood 221 can be securely locked on the cylindrical mounting part 211 in a mounting position in which the protruding length of the dust collecting hood 221 is adjusted. The valley portions 223a of the accordion part forming the bit covering part 223 are features that correspond to the "plurality of mounting points" in this invention.

According to this embodiment, the valley portion 223a with which the hook part 254 is engaged can be selected by utilizing elastic deformation of an accordion part, so that the valley portion 223a to be engaged can be easily changed. Further, in this embodiment, with the construction in which the hook member 253 includes the right and left hook halves 253L, 253R opposed to each other and is constructed to hold the accordion part over its entire circumference, the dust collecting hood 221 can be fastened horizontally or generally parallel to the axis of the hammer bit 119. Further, in order to engage the hook part 254 with the valley portion 223a, the user can press the right and left opposed hook halves 253L, 253R toward each other with fingers, so that ease of operation is enhanced.

Further, in this embodiment, with the construction in which the generally semi-circular ring-like retaining member 259 holds the right and left hook halves 253L, 253R in such a manner as to be wrapped around them from outside, the right and left hook halves 253L, 253R can be securely held in the engaged position. The right and left hook halves 253L, 253R are normally biased by the coil spring 256 in a direction in which it is disengaged from the accordion valley portion 223a. Therefore, when the retaining member 259 wrapped around the right and left hook halves 253L, 253R is released, the right and left hook halves 253L, 253R are moved to a release position (open position) away from the accordion valley portion 223a, and then held in this state. Therefore, the dust collecting hood 221 can be easily extended and contracted.

Further, in this embodiment, the protruding support part 257 provided inside the cylindrical mounting part 211 has a curved outer surface, and the concave surface of the protruding end 255a of the protrusion 255 of each of the right and left hook halves 253L, 253R is engaged with the protruding support part 257. With such a construction, the structure of rotating the right and left hook halves 253L, 253R can be simplified and smooth rotation can be realized.

Third Embodiment of the Invention

A third embodiment of the invention is now explained with reference to FIGS. 21 to 25. This embodiment is a modification to the lock mechanism which serves to hold the dust collecting hood 221 mounted to the cylindrical mounting part 211 as explained in the above-described second embodiment. This embodiment otherwise has the same construction as the first embodiment. For example, it is constructed such that the protruding length of the dust collecting hood 221 protruding from the body 103 can be adjusted by utilizing elastic deformation of the accordion part of the bit covering part 223. Therefore, components in the third embodiment which are substantially identical to those in the second embodiment are given like numerals as in the first embodiment, and they are not described or only briefly described.

Figure 23:
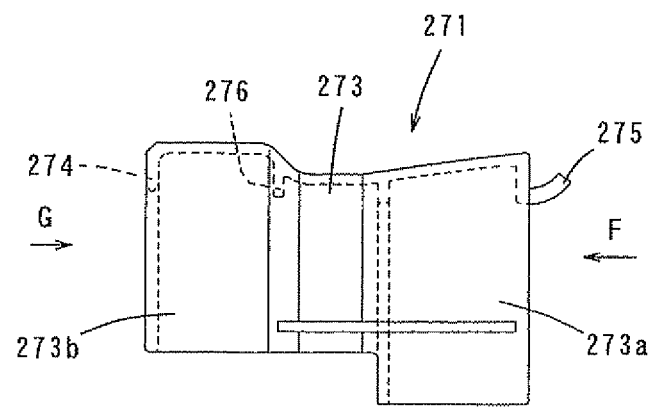
FIG. 23 is a side view showing a lock mechanism for maintaining a mounted state of the dust collecting hood.
Figure 24:
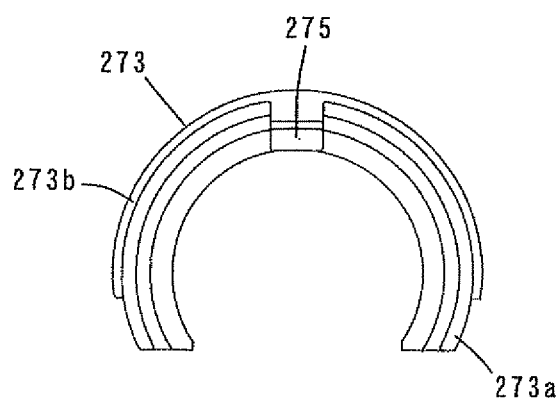
FIG. 24 is a view as viewed from the direction of the arrow F in FIG. 23.
Figure 25:
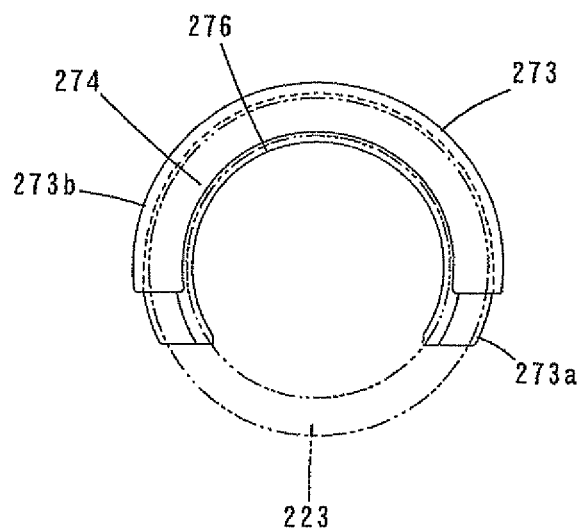
FIG. 25 is a view as viewed from the direction of the arrow G in FIG. 23.

As shown in FIGS. 23 to 25, a lock mechanism 271 according to this embodiment mainly includes a hook member 273 formed as a generally semi-cylindrical member having a shape of a major arc or an arc formed by a partly open circle larger than a semicircle. The hook member 273 has a radially inwardly protruding hook part 274 formed all around one axial end (front end) of the hook member 273 in the circumferential direction and a rearward protruding protrusion 275 having a concave outer surface and formed substantially in the middle of the other axial end (rear end) in the circumferential direction. The hook part 274 can be engaged with the valley portion 223a of the accordion part which forms the bit covering part 223 of the dust collecting hood 221.

Figure 21:
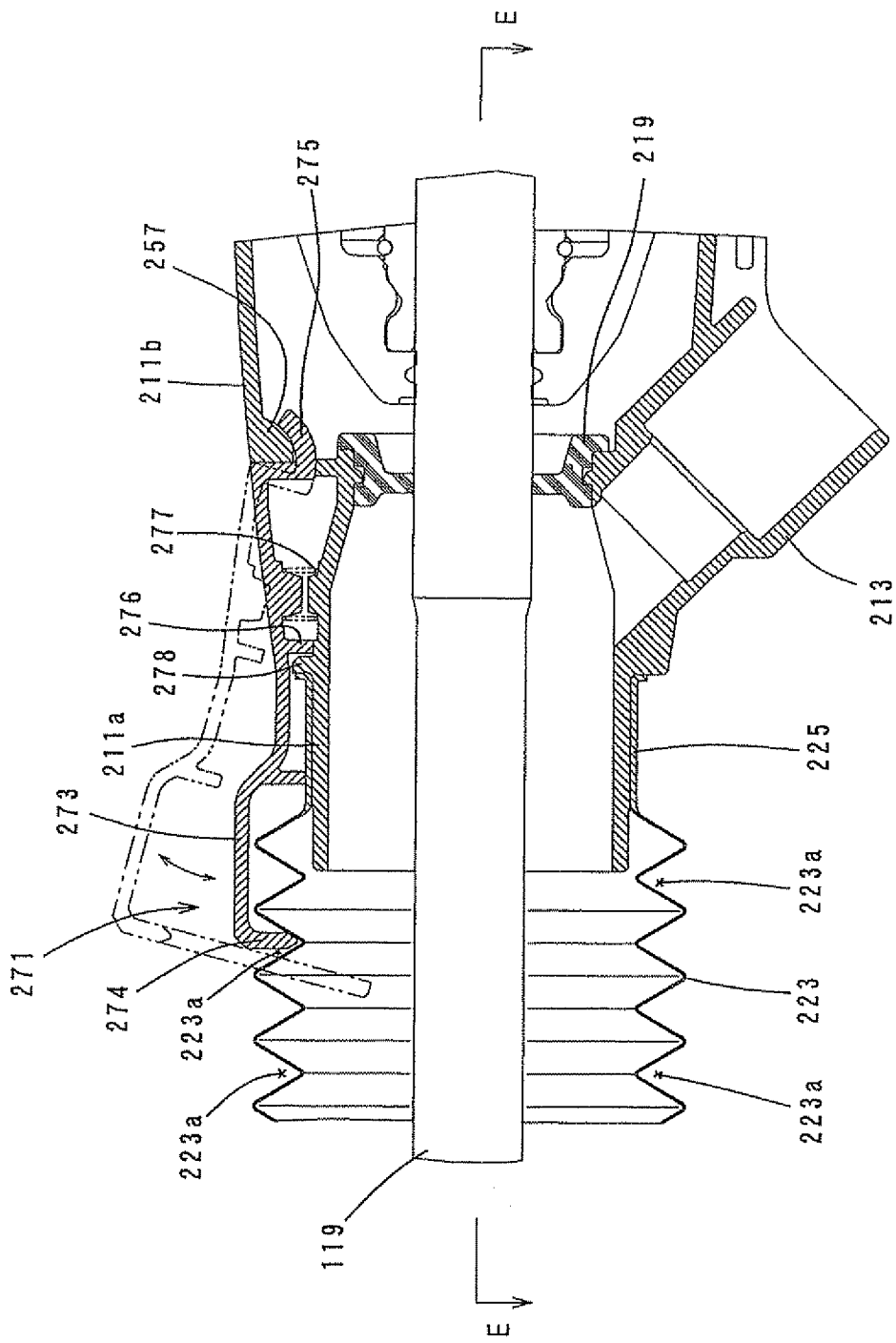
FIG. 21 is a sectional view showing a dust collecting device for use in drilling operation according to a third embodiment of the invention.
Figure 22:
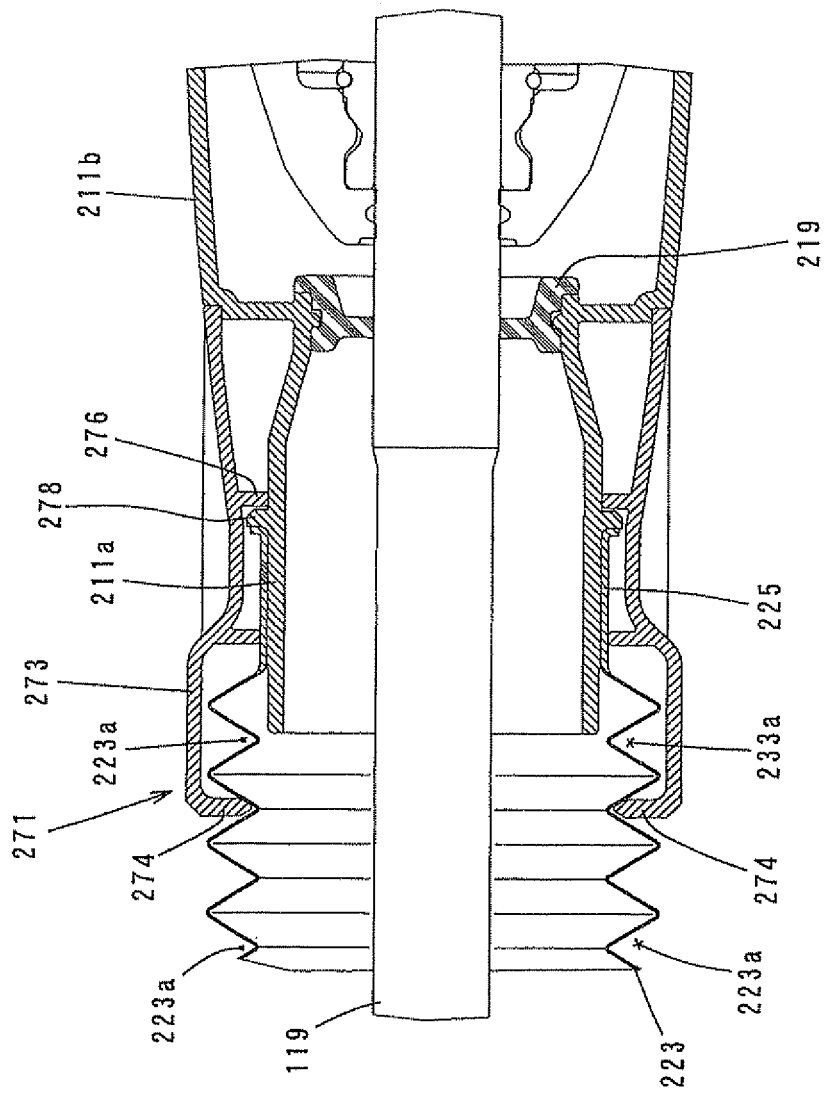
FIG. 22 is a sectional view taken along line E-E in FIG. 21.

As shown in FIGS. 21 and 22, the hook member 273 is disposed with the opening down on the small-diameter cylindrical part 211a of the cylindrical mounting part 211 in such a manner as to cover it from above. Further, the protrusion 275 of the hook member 273 is inserted into the cylindrical part through an opening formed in the cylindrical mounting part 211 and then the concave surface of the protrusion 275 is rotatably engaged with a curved outer surface of the protruding support part 257 formed on an inner surface of the cylindrical part of the cylindrical mounting part 211. Thus, the hook member 273 is mounted to the cylindrical mounting part 211 such that it can rotate (open and close) around the protruding support part 257 in the vertical direction (radial direction) transverse to the axial direction of the hammer bit 119.

The hook part 274 can be engaged with one of the accordion valley portions 223a by rotating the hook member 273 mounted to the cylindrical mounting part 211 in a closing direction (inward) toward the bit covering part 223 around the protruding support part 257. The hook member 273 has a front region (hook side) 273b and a rear region (protrusion side) 273a having a shape of a major arc longer than the arc of the front region 273b, and an inside ridge 276 is formed all around an inner surface of the rear region 273a in the circumferential direction and protrudes radially inward. The inside diameter of the inside ridge 276 is designed to be equal to or slightly larger than the outside diameter of the small-diameter cylindrical part 211a.

Therefore, when the hook member 273 is turned in a closing direction around the protruding support part 257, an open-side end of the inside ridge 276 comes in contact with an outer surface of the small-diameter cylindrical part 211a, so that the hook member 273 is pushed out. Specifically, the hook member 273 covers the small-diameter cylindrical part 211a while its opening side expands radially outward, and at the same time, the hook part 274 is engaged with the opposed accordion valley portion 223a. Thus, the mounted state of the dust collecting hood 221 with respect to the cylindrical mounting part 211 is maintained. As shown in FIGS. 8 and 9, when the hook part 274 of the hook member 273 is engaged with the accordion valley portion 223a, a front surface of the inside ridge 276 of the hook member 273 comes in contact with a rear surface of an outside protrusion 278 which protrudes from the outer surface of the small-diameter cylindrical part 211a and extends in the circumferential direction, so that the hook member 273 is prevented from moving forward.

Further, the hook member 273 is constantly biased in the open direction or outward (the direction of disengagement of the hook part 274 from the valley portion 223a) by the biasing member in the form of the coil spring 277. As shown in FIG. 21, the coil spring 277 is disposed between the inner surface of the rear region 273a of the hook member 273 and the outer surface of the small-diameter cylindrical part 211a, and biases the hook member 273 so as to cause it to rotate outward.

As described above, the lock mechanism 271 of this embodiment is mounted to the cylindrical mounting part 211 such that the generally semi-cylindrical hook member 273 can open and close around the protruding support part 257 in the vertical direction (radial direction) transverse to the axial direction of the hammer bit 119. Therefore, the protruding length of the dust collecting hood 221 protruding from the body 103 is adjusted to be adapted to the length of the hammer bit 119 to be used, and in this state, the hook member 273 is rotated in the closing direction and then the hook part 274 of the hook member 273 is engaged with arbitrarily selected one of the accordion valley portions 223a forming the bit covering part 223. In this manner, like the above-described first embodiment, the mounted state of the dust collecting hood 221 with respect to the cylindrical mounting part 211 can be securely maintained.

Further, according to this embodiment, the hook member 273 is formed by a semi-cylindrical member having the shape of a major arc, and is designed such that the hook part 274 is engaged with or disengaged from the accordion valley portion 223a by utilizing radial elastic deformation of the hook member 273. With such a construction, it is not necessary to use an additional member in order to maintain the engagement of the hook part 274 with the valley portion 223a, so that the number of parts can be reduced.

Fourth Embodiment of the Invention

Figure 26:
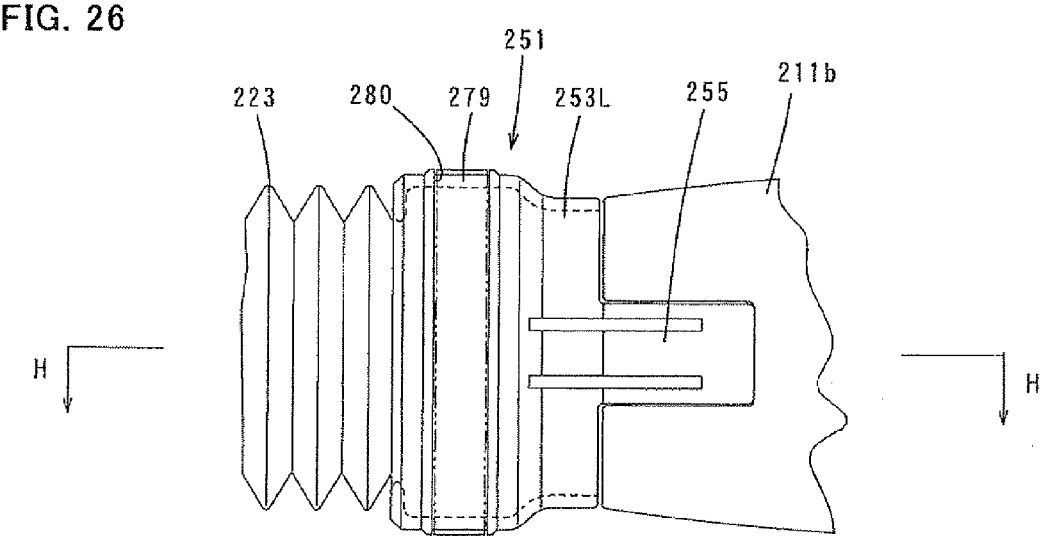
FIG. 26 is a plan view showing a lock mechanism in a dust collecting device for use in drilling operation according to a fourth embodiment of the invention.
Figure 27:
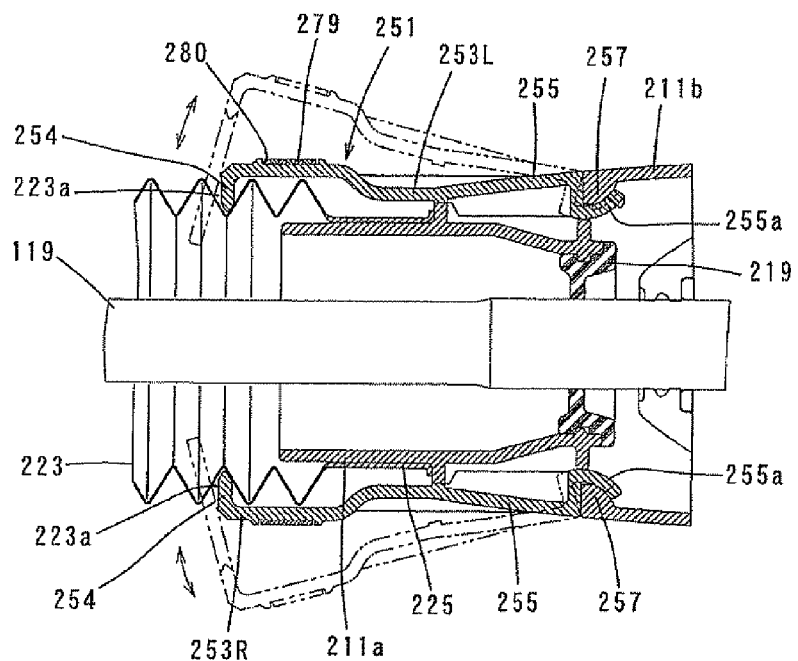
FIG. 27 is a sectional view taken along line H-H in FIG. 26.
Figure 28:
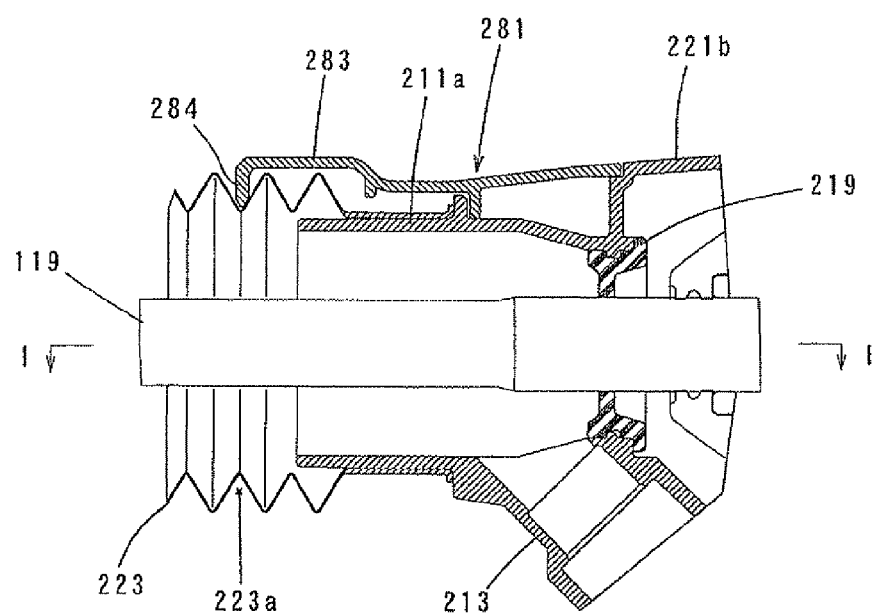
FIG. 28 is a sectional view showing a dust collecting device for use in drilling operation according to a fifth embodiment of the invention.
Figure 29:
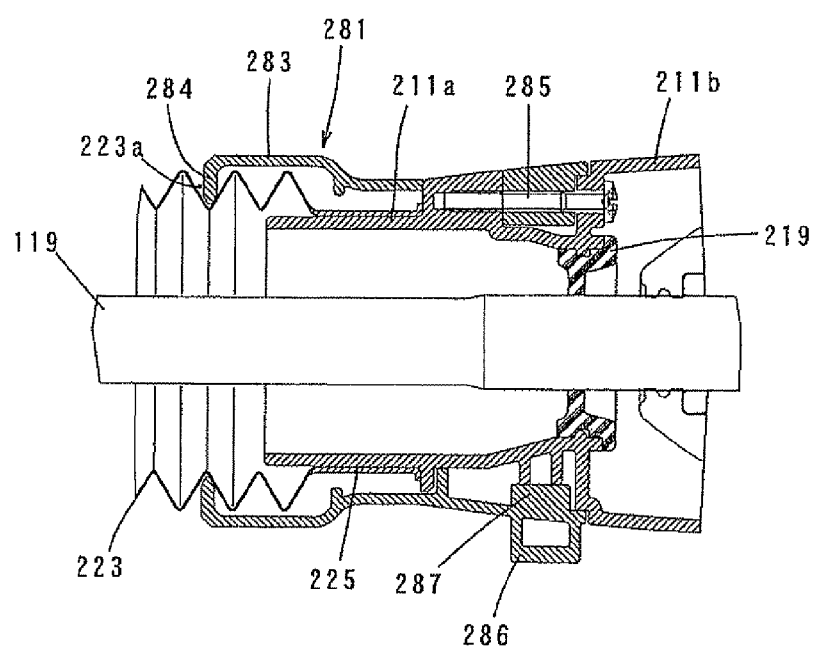
FIG. 29 is a sectional view taken along line I-I in FIG. 28.
Figure 30:
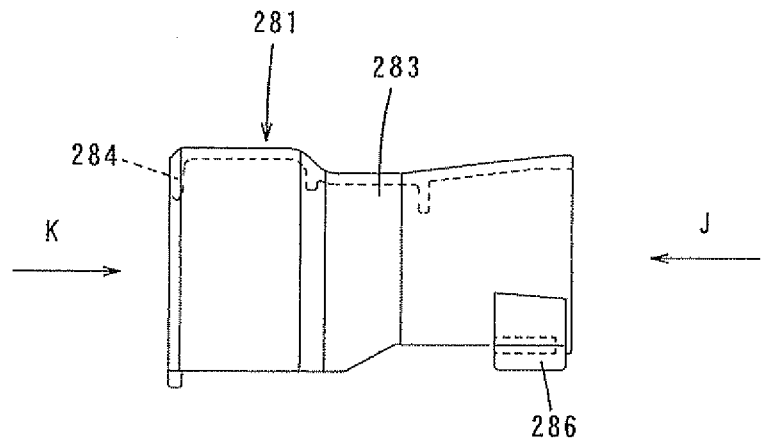
FIG. 30 is a side view showing a lock mechanism.
Figure 31:
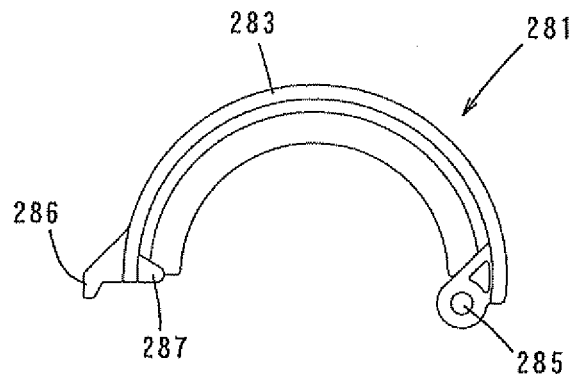
FIG. 31 is a view as viewed from the direction of the arrow J in FIG. 30.
Figure 32:
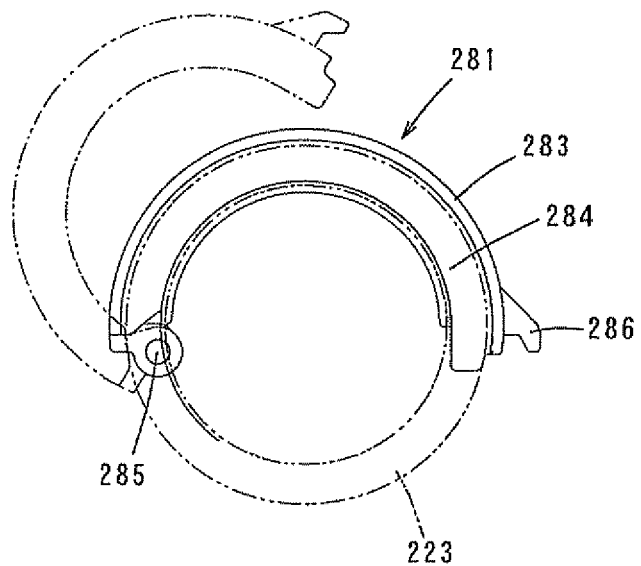
FIG. 32 is a view as viewed from the direction of the arrow K in FIG. 30.
Figure 33:
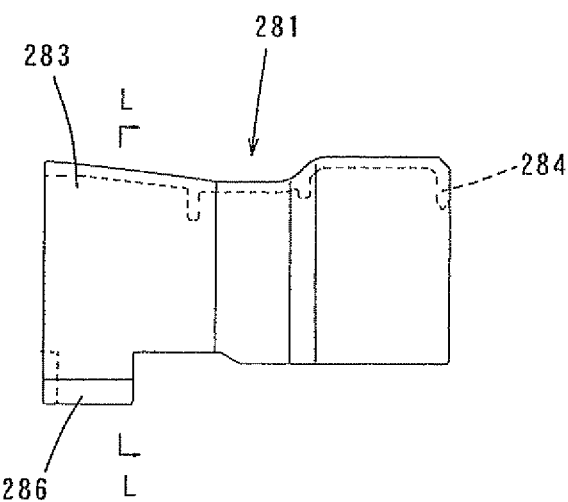
FIG. 33 is a side view as viewed from the direction opposite from that of FIG. 30.
Figure 34:
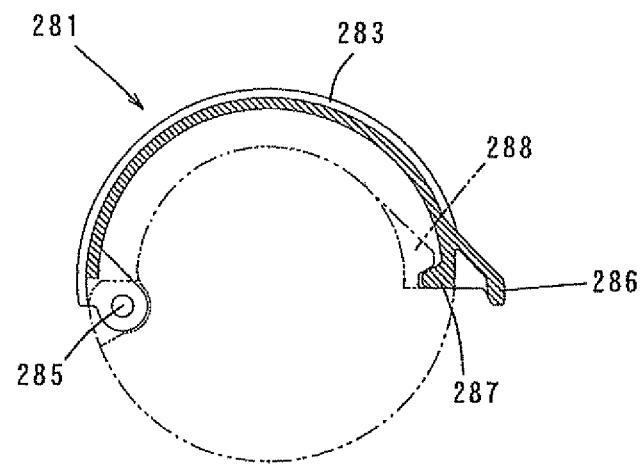
FIG. 34 is a sectional view taken along line L-L in FIG. 33.

A fourth embodiment of the invention is now explained with reference to FIGS. 26 and 27. This embodiment is a modification to the lock mechanism which serves to maintain the mounted state of the dust collecting hood 221 with respect to the cylindrical mounting part 211 in the above-described second embodiment. The lock mechanism 251 of this embodiment is different from that of the second embodiment in that the retaining member 259 which is designed as a ring-like member in the form of a major arc slightly longer than a semicircular arc in the second embodiment is formed by a ring-like flat rubber band 279 and the coil spring 256 is not used. In the other points, the lock mechanism 251 has the same construction as in the first embodiment. Therefore, components in the third embodiment which are substantially identical to those in the second embodiment are given like numerals as in the first embodiment, and they are not described or only briefly described.

The rubber band 279 is elastically fitted in an annular groove 280 which is formed in the outer circumferential surface of each of the right and left hook halves 253L, 253R in the vicinity of the hook part 254. With such a construction, the right and left hook halves 253L, 253R can be held in the closed position in which the hook part 254 is engaged with the accordion valley portion 223a. Further, the protruding length of the dust collecting hood 221 protruding from the body 103 can be adjusted with the rubber band 279 removed from the right and left hook halves 253L, 253R.

According to this embodiment, with the construction in which the retaining member for holding the right and left hook halves 253L, 253R in the closed position is formed by the rubber band 279, the structure is simple and cost reduction can be realized.

Fifth Embodiment of the Invention

A fifth embodiment of the invention is now explained with reference to FIGS. 28 to 34. This embodiment is a modification to the lock mechanism which serves to maintain the mounted state of the dust collecting hood 221 with respect to the cylindrical mounting part 211 in the above-described second embodiment. This embodiment otherwise has the same construction as the second embodiment. For example, it is constructed such that the protruding length of the dust collecting hood 221 protruding from the body 103 can be adjusted by utilizing elastic deformation of the accordion part of the bit covering part 223. Therefore, components in the fourth embodiment which are substantially identical to those in the second embodiment are given like numerals as in the first embodiment, and they are not described or only briefly described.

A lock mechanism 281 of this embodiment mainly includes a hook member 283 formed as a generally semi-cylindrical member. The hook member 283 has a radially inwardly protruding hook part 284 formed all around one axial end (front end) of the hook member 283 in the circumferential direction, and the hook part 284 can be engaged with the valley portion 223a of the accordion part which forms the bit covering part 223 of the dust collecting hood 221. One circumferential end of the hook member 283 is mounted to the small-diameter cylindrical part 211a of the cylindrical mounting part 211 at the other axial end (rear end) of the hook member by a shaft 285 and can rotate (open and close) around an axis parallel to the axis of the hammer bit 119. With such a construction, when the hook member 283 is turned toward a closed position or toward the cylindrical mounting part 211 around the shaft 285, the hook part 284 is engaged with the accordion valley portion 223a. Further, when the hook member 283 is turned toward an open position or away from the cylindrical mounting part 211 around the shaft 285, the hook part 284 is disengaged from the accordion valley portion 223a.

Further, a radially outwardly protruding disengagement tab 286 is formed on the other circumferential end (on the opposite side of the axis from the shaft 285) on the other axial end of the hook member 283. Further, an engagement protrusion 287 is formed on an inner surface of the disengagement tab 286. When the hook member 283 is turned toward the small-diameter cylindrical part 211a and placed in the closed position, the engagement protrusion 287 climbs over an inverted V-shaped holding projection 288 formed on the outer surface of the small-diameter cylindrical part 211a of the cylindrical mounting part 211, by elastic deformation of the hook member 283, and is engaged with the holding projection 288 (see FIG. 34). As a result, the hook member 283 is held in the closed position in which the hook part 254 is engaged with the accordion valley portion 223a.

As described above, the lock mechanism 281 of this embodiment is designed to be turned around the axis parallel to the axis of the hammer bit 119 such that the semi-cylindrical hook member 283 moves between the closed position in which the hook part 284 is engaged with the accordion valley portion 223a and the open position in which the hook part 284 is disengaged from the accordion valley portion 223a. When the engagement protrusion 287 of the hook member 283 placed in the closed position climbs over the holding projection 288 of the small-diameter cylindrical part 211a and engages therewith, the hook part 284 is held engaged with the accordion valley portion 223a. Therefore, like the above-described first embodiment, the mounted state of the dust collecting hood 221 with respect to the cylindrical mounting part 211 can be securely maintained.

Further, in order to disengage the hook part 284 from the accordion valley portion 223a, the disengagement tab 286 is pulled radially outward (to the right as viewed in FIG. 34) with the user's fingertip such that the engagement projection 288 is disengaged from the holding protrusion 287 of the small-diameter cylindrical part 211a, and thereafter the hook member 283 is turned toward the open position.

Further, in this embodiment, with the construction in which the engagement protrusion 287 provided as a means of holding the hook part 284 of the hook member 283 in engagement with the accordion valley portion 223a is integrally formed with the hook member 283, the number of parts can be reduced, so that the structure is simple and cost reduction can be realized.

Sixth Embodiment of the Invention

Figure 35:
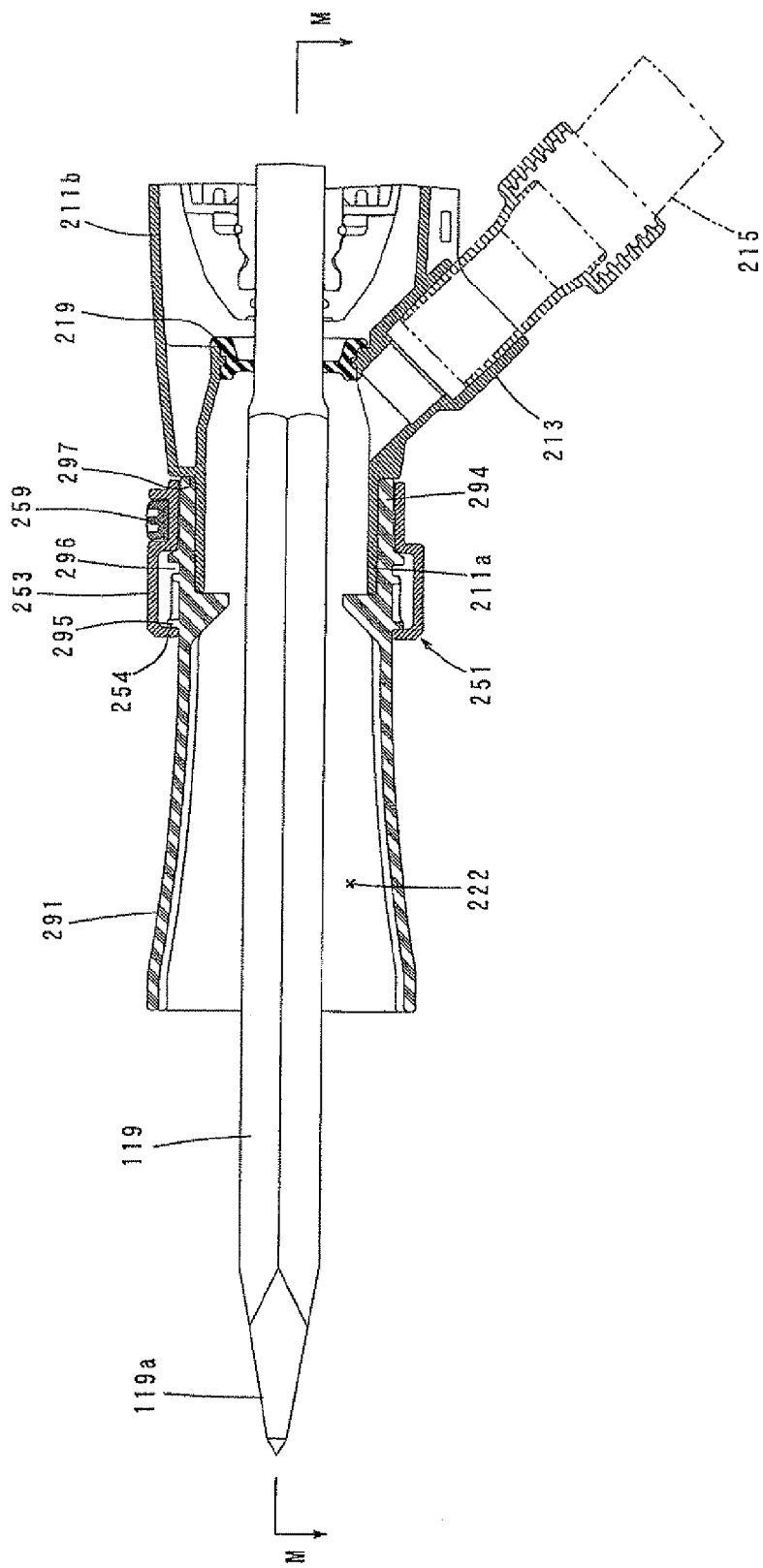
FIG. 35 is a sectional view showing a dust collecting device for use in chipping operation according to a sixth embodiment of the invention.
Figure 36:
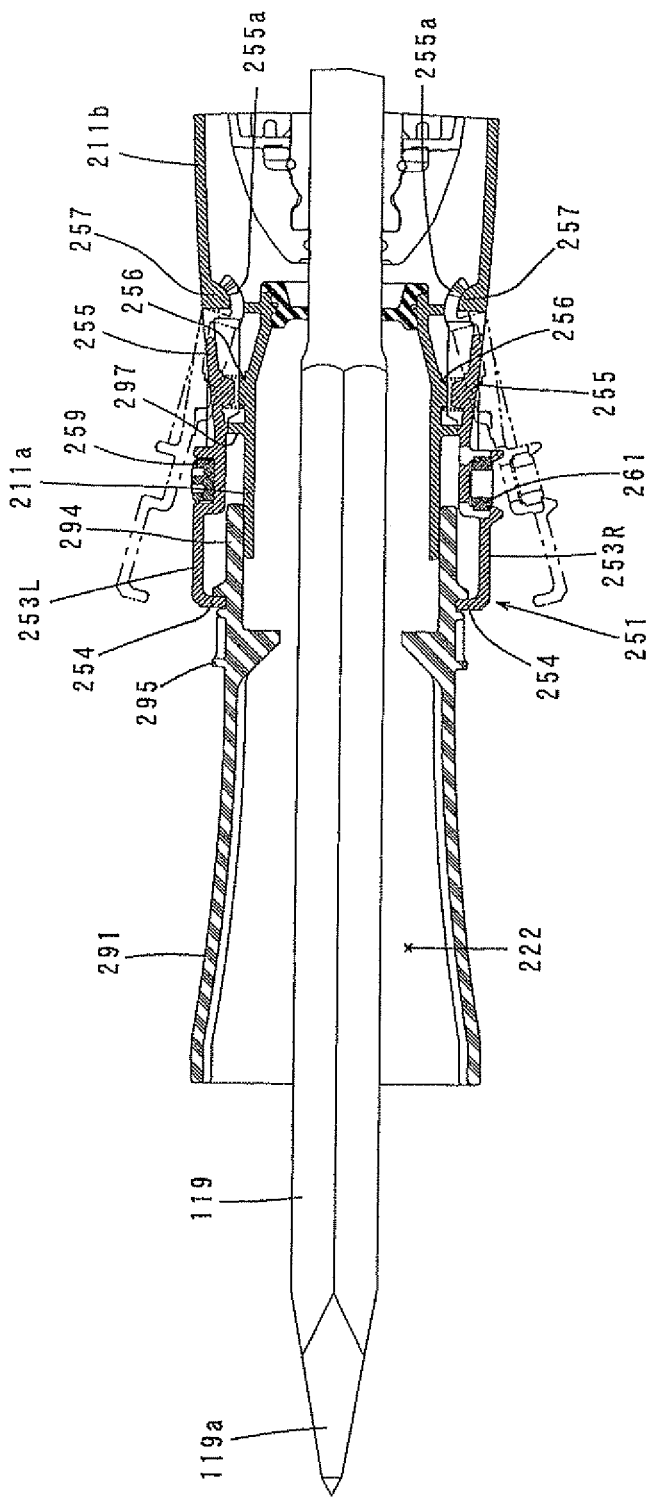
FIG. 36 is a sectional view taken along line M-M in FIG. 35.

A dust collecting device 210 according to a sixth embodiment of the invention is now explained with reference to FIGS. 35 and 36. The dust collecting device 210 of this embodiment is applied to the hammer drill 101 which is used for chipping operation and driven in the hammering mode in which the hammer bit 119 performs only the hammering movement. As for the construction of the dust collecting device 210, a dust collecting hood 291 for covering the hammer bit 119 has a different construction from the dust collecting hood 221 of the dust collecting device 210 in the above-described second embodiment. The dust collecting device 210 otherwise has the same construction as in the first embodiment. For example, the cylindrical mounting part 211, the structure of mounting the cylindrical mounting part 211 to the body 103 and the lock mechanism 251 for maintaining the mounted state of the dust collecting hood 291 with respect to the cylindrical mounting part 211 have the same construction as in the dust collecting device 210 of the first embodiment. Therefore, components in the fifth embodiment which are substantially identical to those in the second embodiment are given like numerals as in the first embodiment, and they are not described or only briefly described.

The dust collecting hood 291 for use in chipping operation is a cylindrical member having a longitudinal length such that the bit tip 119a of the hammer bit (chisel) 119 for use in chipping operation protrudes a predetermined length (long enough to be reliably kept visible) from the front end of the dust collecting hood 291 attached to the front end of the cylindrical mounting part 211. Further, the dust collecting hood 291 has both front and rear ends open and is made of rubber or synthetic resin, and it is formed by a rigid element of which longitudinal length is not changed so that its length is kept constant. The dust collecting hood 291 for use in chipping operation is a feature that corresponds to the "dust collecting hood" in this invention.

A rear open end 294 of the dust collecting hood 291 is fitted over the front end region of the cylindrical mounting part 211 or the small-diameter cylindrical part 211*a* and can slide in the longitudinal direction. With such a construction, the protruding length of the dust collecting hood 291 protruding from the body 103 can be changed (adjusted). FIG. 35 shows the state in which the dust collecting hood 291 is moved (slid) to the rearmost position (on the body 103 side) on the small-diameter cylindrical part 211*a* in order to be used with a short hammer bit 119, and FIG. 36 shows the state in which the dust collecting hood 291 is moved forward toward the front end of the small-diameter cylindrical part 211*a* in order to be used with a long hammer bit 119. Specifically, according to this embodiment, by sliding the dust collecting hood 291 with respect to the small-diameter cylindrical part 211*a*, the position of the dust collecting hood 291 is changed in the longitudinal direction, so that the protruding length of the dust collecting hood 291 protruding from the body 103 can be adjusted and the length of the dust collecting hood 291 can be adapted to the length of the hammer bit 119 to be used for hammering operation.

A ring-like engagement part 295 is formed forward of a ring-like engagement groove 296 in an outer surface of the rear open end 294 of the dust collecting hood 291 with a predetermined spacing therebetween in the longitudinal direction. As shown in FIG. 35, when the dust collecting hood 291 is moved to the rearmost position, the rear end of the dust collecting hood 291 comes in contact with a front wall surface 297 which is formed in the connecting region between the small-diameter cylindrical part 211*a* and the large-diameter cylindrical part 211*b* and extends in a direction transverse to the axial direction of the hammer bit 119. In this state, the hook part 254 of the hook member 253 of the lock mechanism 251 is engaged with a front surface of the engagement part 295, so that the dust collecting hood 291 is prevented from moving in the longitudinal direction (the back-and-forth direction) with respect to the cylindrical mounting part 211. Further, as shown in FIG. 36, when the dust collecting hood 291 is moved forward toward the front end, the hook part 254 of the hook member 253 is engaged with the engagement groove 296, so that the dust collecting hood 291 is prevented from moving in the longitudinal direction (the back-and-forth direction) with respect to the cylindrical mounting part 211. Specifically, the mounted state of the dust collecting hood 291 with respect to the cylindrical mounting part 211 is maintained by engagement of the hook part 254 of the hook member 253 with the engagement part 295 or the engagement groove 296. The engagement part 295 and the engagement groove 296 are features that correspond to the "plurality of mounting points" in this invention. Further, in this embodiment, the plurality of mounting points are described as being two front and rear points, but more mounting points can be provided.

The dust collecting device 210 according this embodiment is constructed as described above. Therefore, during chipping operation, dust generated by chipping operation is sucked from the open front end of the dust collecting hood 291 into the dust collecting passage in the form of the inner space 222 of the dust collecting hood 291. The dust is then led from the inner space 222 into the outside dust collector through the hose connecting port 213 of the cylindrical mounting part 211 and the dust collecting hose 215, and can be collected in the outside dust collector. When the hammer bits 119 of different lengths are selectively attached to the body 103 by replacement in order to perform chipping operation, as described above, the protruding length of the dust collecting hood 291 protruding from the body 103 is adjusted in the axial direction of the hammer bit by moving the dust collecting hood 291 forward or rearward with respect to the small-diameter cylindrical part 211*a*. Thus, the dust collecting hood 291 can be adapted to the length of the hammer bit 119. Further, after such adjustment, the dust collecting hood 291 can be securely locked on the cylindrical mounting part 211 by engagement of the hook part 254 of the hook member 253 with the engagement part 295 or the engagement groove 296.

Further, in this embodiment, the lock mechanism 251 for locking the dust collecting hood 291 on the cylindrical mounting part 211 is described as being constructed like the lock mechanism 251 of the first embodiment, but any of the lock mechanisms 251, 271, 281 described in the second, the third and the fourth embodiments may also be applied to this embodiment.

In each of the above-described embodiments, the hammer drill 101 is explained as a representative example of the power tool, but the invention can be applied to other power tools such as an electric hammer in which the hammer bit 119 performs only hammering movement in the longitudinal direction, and an electric drill in which the hammer bit 119 performs only rotation in the circumferential direction.

In accordance with the above-described aspect of the invention, following features can be provided.

Aspect 1:

A dust collecting device, including a fixing part which is mounted to a tool body of a power tool to which a tool bit is coupled, and a dust collecting hood which is mounted to the fixing part and covers the tool bit over a predetermined range in an axial direction of the tool bit, comprising:

a plurality of mounting points which are formed on the dust collecting hood at predetermined intervals in the axial direction of the tool bit and at which the dust collecting hood can be mounted to the fixing part, wherein a protruding length of the dust collecting hood protruding from the tool body in the axial direction of the tool bit can be changed by selecting arbitrary one of the mounting points.

Aspect 2:

The dust collecting device as defined in aspect 1, wherein the dust collecting hood has an elastic region which can elastically deform in the axial direction of the tool bit, and the selection of the mounting point is made by utilizing elastic deformation of the elastic region.

Aspect 3:

The dust collecting device as defined in aspect 2, wherein the elastic region comprises an accordion part.

Aspect 4:

The dust collecting device as defined in aspect 1, wherein the dust collecting hood is designed such that the selection of the mounting point can be made with a length of the dust collecting hood kept constant in the axial direction of the tool bit.

Aspect 5:

The dust collecting device as defined in any one of aspects 1 to 4, comprising a lock mechanism that is provided on the fixing part and serves to maintain a mounted state of the dust collecting hood with respect to the fixing part by engaging with the selected mounting point.

Aspect 6:

A power tool, having the dust collecting device as defined in any one of aspects 1 to 5.

Aspect 7:

The dust collecting device as defined in aspect 2, wherein the plurality of mounting points are provided in the elastic region.

Aspect 8:

The dust collecting device as defined in aspect 3, wherein the plurality of mounting points comprise valley portions of the accordion part.

Aspect 9:

The dust collecting device as defined in aspect 5, wherein the lock mechanism has a hook member disposed outside the dust collecting hood, and the hook member is engaged with the selected mounting point by moving toward the dust collecting hood in a direction transverse to the axial direction of the tool bit and disengaged from the mounting point by moving away from the dust collecting hood.

Aspect 10:

The dust collecting device as defined in aspect 9, wherein the hook member includes semi-cylindrical hook halves which are opposed to each other on both sides of the dust collecting hood, and the hook member holds the dust collecting hood by engagement of the hook halves with the mounting point of the dust collecting hood along its entire circumference."

Aspect 11:

The dust collecting device as defined in aspect 9, wherein the hook member is supported in such a manner as to be rotatable around an axis extending in a direction transverse to the axial direction of the tool bit, and by rotating around the axis, the hook member is engaged with and disengaged from the mounting point of the dust collecting hood.

Aspect 12:

The dust collecting device as defined in aspect 9, wherein the hook member is supported in such a manner as to be rotatable around an axis extending parallel to the axial direction of the tool bit, and by rotating around the axis, the hook member is engaged with and disengaged from the mounting point of the dust collecting hood.

DESCRIPTION OF NUMERALS 101 hammer drill (power tool)
103 body
105 crank housing
106 motor housing
107 barrel
107a grip mounting part
108 chuck
109 handgrip (main handle)
109a trigger
119 hammer bit (tool bit)
119a bit tip
191 tool holder
192 cylinder
193 striking mechanism
194 striker
195 impact bolt
201 side grip
203 mounting band
210 dust collecting device
211 cylindrical mounting part
211a small-diameter cylindrical part
211b large-diameter cylindrical part
211c cylindrical part extension
212 ridge
213 hose connecting port
215 dust collecting hose
217 binding band
219 rubber seal
221 dust collecting hood for use in drilling operation (dust collecting part component)
222 inner space (dust collecting passage)
223 bit covering part (tool bit covering part)
223a valley (mounting point)
225 opening
225a annular recess
227 connecting ring (fitting part)
227a stopper protrusion
227b engagement protrusion
231 connecting ring for a small diameter (fitting part)
233 inner ring
235 outer ring
237 spoke
238 space (dust collecting passage)
241 dust collecting hood for use in chipping operation (dust collecting part component)
243 bit covering part (tool bit covering part)
245 front connecting part (fitting part)
245a annular groove
247 rear connecting part (fitting part)
247a annular recess
247b engagement protrusion
251 lock mechanism
253 hook member
253a annular groove
253L, 253R hook half
254 hook part
255 protrusion
255a protruding end
256 coil spring (biasing member)
257 protruding support part
259 retaining member
261 shaft
263 tab
271 lock mechanism
273 hook member
273a rear region
273b front region
274 hook part
275 protrusion
276 inside ridge
277 coil spring (biasing member)
278 outside protrusion
279 rubber band
280 annular groove
281 lock mechanism
283 hook member
284 hook part
285 shaft
286 disengagement tab
287 engagement protrusion
288 holding projection
291 dust collecting hood
294 rear open end
295 engagement part
296 engagement groove
297 front wall surface

What we claim is:

1. A dust collecting device, which is attached to a power tool that performs a predetermined operation on a workpiece by driving a tool bit coupled to a front end region of a tool body, and collects dust generated by operation, comprising:
a dust collecting part that covers the tool bit over a predetermined range in an axial direction and collects dust generated by operation,
wherein the dust collecting part comprises (i) a dust collecting part component, which has a tool bit covering part having a predetermined inside diameter, one end of the dust collecting part component being configured to be attached to the power tool, and (ii) a fitting part, which is formed separately from the dust collecting part component and has a substantially constant inside diameter, the fitting part being detachably attached to another end of the dust collecting part component such that the fitting part is configured to form a suction port and is configured to be detachably attached to another dust collecting part component which is formed separately from the fitting part, and wherein the tool bit covering part comprises a cylindrical accordion part which can contract and extend, and the fitting part comprises a ring-like reinforcing member which is formed separately from the accordion part.

2. The dust collecting device as defined in claim 1, which is used with a power tool for performing a drilling operation on a workpiece at least by rotation of the tool bit, wherein the dust collecting part component is constructed to be able to change its length in the axial direction during drilling operation.

3. The dust collecting device as defined in claim 1, wherein the fitting part of the dust collecting part component has a smaller inside diameter than the accordion part, and a space is formed between an inside wall and an outside wall of the fitting part and forms a dust collecting passage extending through the fitting part in the axial direction.

4. The dust collecting device as defined in claim 1, which is used with a power tool for performing a chipping operation on a workpiece by linear movement of the tool bit in the axial direction, wherein the dust collecting part component is constructed such that its length in the axial direction is kept unchanged during chipping operation.

5. The dust collecting device as defined in claim 4, further comprising a dust collecting device body which is mounted to cover the front end region of the tool body, wherein the dust collecting part component has a first fitting part formed on one axial end and having a grooved outer surface for fitting and a second fitting part formed on the other axial end and having a grooved inner surface for fitting, and the first fitting part is fitted on the front end of the dust collecting device body and forms a grip to be held by a user.

6. A power tool, having the dust collecting device as defined in claim 1.

7. The dust collection device as defined in claim 1, further comprising a dust collecting device body to which the dust collection part is detachably attached, the dust collecting device body being mounted to cover the front end region of the tool body, wherein the dust collecting part component includes a first dust collecting part component which corresponds to a first operation and a second dust collecting part component which corresponds to a second operation which is a different kind of operation from the first operation, the first dust collecting part component and the second dust collecting part component being respectively mountable to a single dust collection device body, and the dust collecting part component is selected between the first dust collecting part component and the second dust collecting part component based on a kind of the operation, and the dust collecting part to be attached to the dust collecting device body is formed by the selected dust collecting part component and further formed in one of the first form and the second form which is selected based on the length of the tool bit.

8. The dust collection device as defined in claim 1, wherein the fitting part is configured to be pressed against the workpiece when the predetermined operation is performed on the workpiece.

9. A dust collecting device, which is attached to a power tool that performs a predetermined operation on a workpiece by driving a tool bit coupled to a front end region of a tool body, and collects dust generated by operation, comprising:

a dust collecting part that covers the tool bit over a predetermined range in an axial direction and collects dust generated by operation, wherein the dust collecting part comprises (i) a plurality of the dust collecting part components, each of the plurality of the dust collecting part components having a tool bit covering part having a predetermined inside diameter and (ii) a plurality of fitting parts, which are formed separately from the plurality of dust collecting part components and are used to connect the plurality of the dust collecting part components, each of the plurality of fitting parts having a substantially constant inside diameter, and the dust collecting part being structured such that the plurality of the dust collecting part components being detachably connected in the axial direction by placing a fitting part between two dust collecting part components, the fitting part being detachably attached to each of the two dust collecting part components.

10. The dust collecting device as defined in claim 9, wherein, the plurality of the dust collecting part components are identically shaped.

11. A dust collecting device, which is attached to a power tool that performs a predetermined operation on a workpiece by driving a tool bit coupled to a front end region of a tool body, and collects dust generated by operation, comprising:

a dust collecting part that covers the tool bit over a predetermined range in an axial direction and collects dust generated by operation, and a dust collecting device body that has a cylindrical hollow shape extending in the axial direction, the one end of the dust collecting device body being detachably attached to the power tool, and the dust collecting device body having an opening that connects an outer surface and an inner surface, the opening is configured to receive a dust collecting hose to which the dust is guided, wherein the dust collecting part comprises (i) a dust collecting part component, which has a tool bit covering part having a predetermined inside diameter, one end of the dust collecting part component being configured to be detachably attached to another end of the dust collecting device body, and (ii) a fitting part, which has a substantially constant inside diameter, the fitting part being detachably attached to another end of the dust collecting part component such that the fitting part is configured to form a suction port and is configured to be detachably attached to another dust collecting part component.

* * * * *